US012681875B2

(12) United States Patent
Jones

(10) Patent No.: US 12,681,875 B2
(45) Date of Patent: Jul. 14, 2026

(54) INTER-DRIVE COMMUNICATION FOR COOPERATIVE OPERATIONS

(71) Applicant: Samsung Electronics Co., Ltd., Suwon-si (KR)

(72) Inventor: Marc Timothy Jones, Longmont, CO (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/642,795

(22) Filed: Apr. 22, 2024

(65) Prior Publication Data

US 2025/0147903 A1 May 8, 2025

Related U.S. Application Data

(60) Provisional application No. 63/547,138, filed on Nov. 2, 2023.

(51) Int. Cl.
*G06F 13/36* (2006.01)
*G06F 13/16* (2006.01)

(52) U.S. Cl.
CPC ................................ *G06F 13/1673* (2013.01)

(58) Field of Classification Search
None
See application file for complete search history.

(56) References Cited

U.S. PATENT DOCUMENTS

| | | | |
|---|---|---|---|
| 5,671,365 A * | 9/1997 | Binford ................. | G06F 13/126 |
| | | | 710/263 |
| 8,180,855 B2 | 5/2012 | Aiello et al. | |
| 11,550,500 B2 | 1/2023 | Gao et al. | |
| 11,785,087 B1 * | 10/2023 | Marcovitch ......... | H04L 67/1097 |
| | | | 709/217 |
| 12,001,352 B1 * | 6/2024 | Kheria ................... | G06F 9/544 |
| 2017/0123955 A1 | 5/2017 | Hayashi et al. | |
| 2020/0004701 A1 | 1/2020 | Subbarao et al. | |
| 2020/0159584 A1 | 5/2020 | Cho et al. | |
| 2020/0326891 A1 * | 10/2020 | Luo ...................... | G06F 3/0688 |
| 2022/0156150 A1 | 5/2022 | Peake et al. | |
| 2023/0034049 A1 * | 2/2023 | Lo ....................... | G06F 12/0284 |
| 2023/0198740 A1 | 6/2023 | Kachare et al. | |
| 2023/0221885 A1 | 7/2023 | Moon | |
| 2023/0280936 A1 | 9/2023 | Ki | |
| 2023/0342087 A1 * | 10/2023 | He ....................... | G06F 13/1668 |

OTHER PUBLICATIONS

European Extended Search Report for Application No. 24210066.7, mailed Mar. 18, 2025.

* cited by examiner

*Primary Examiner* — Henry Tsai
*Assistant Examiner* — Dean Phan
(74) *Attorney, Agent, or Firm* — Renaissance IP Law Group LLP

(57) ABSTRACT

A system is disclosed. The system may include two devices, along with a processor to communicate with the two devices. A buffer may store an entry including a communication from one device to the other device.

20 Claims, 11 Drawing Sheets

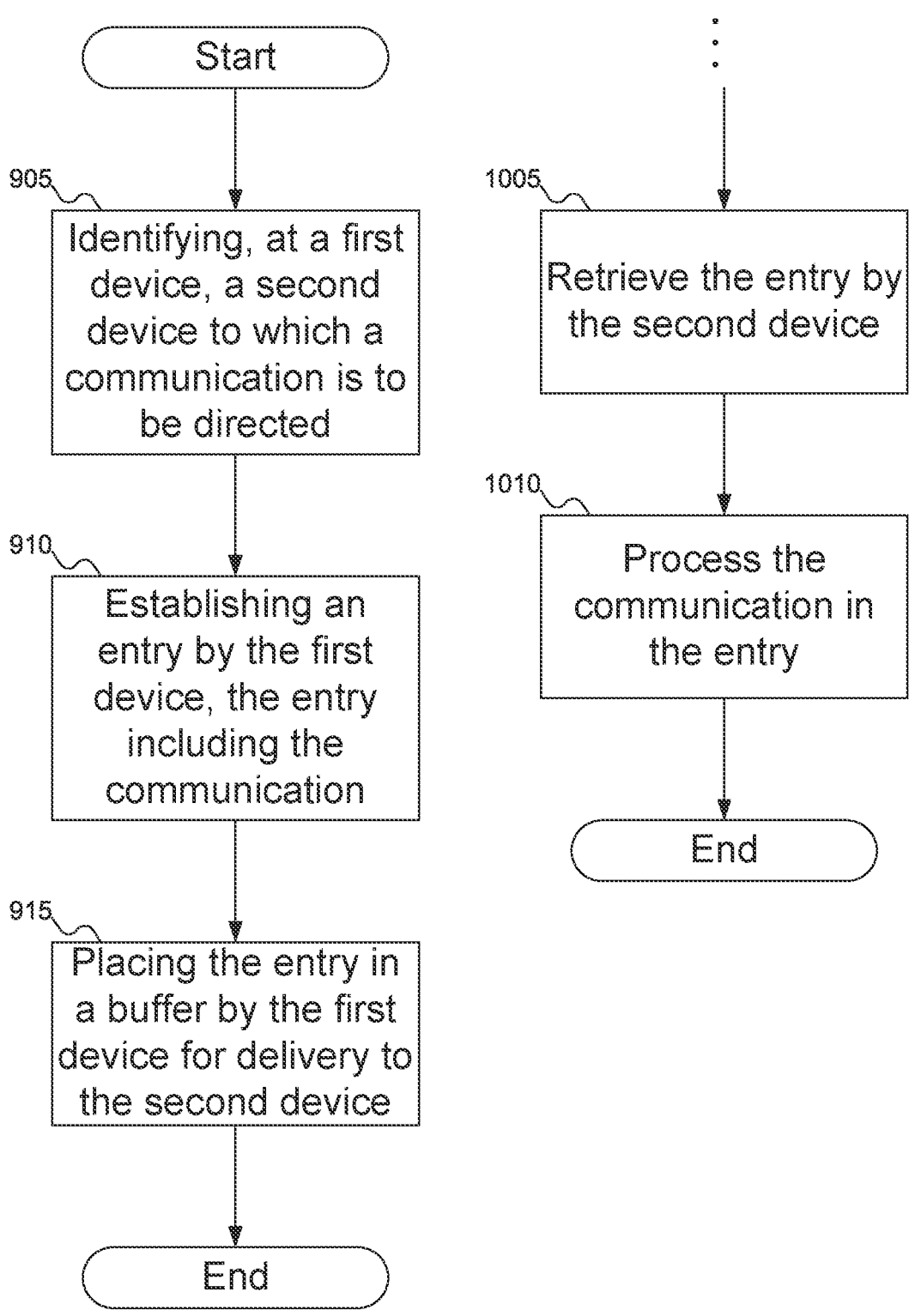
FIG. 9                 FIG. 10

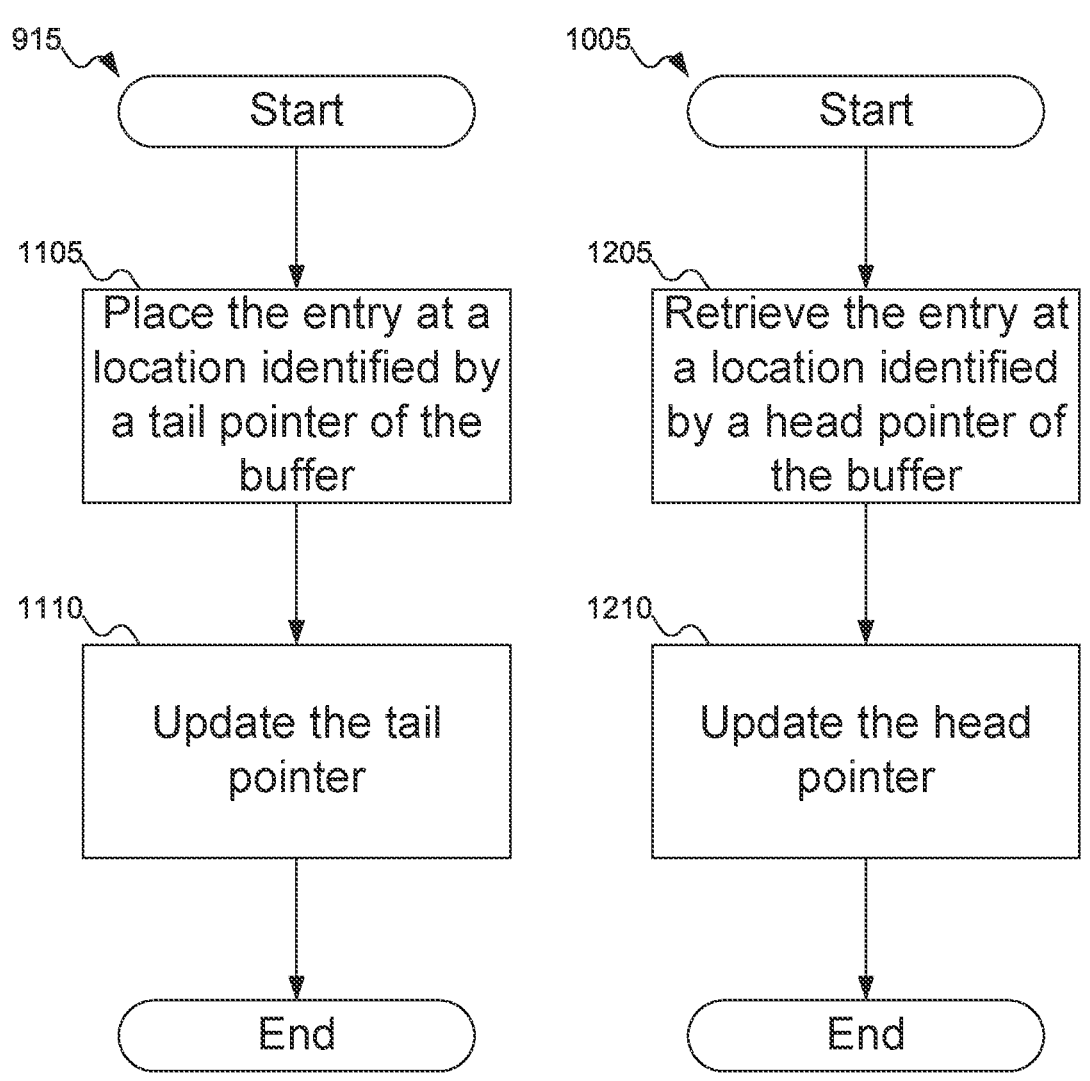
FIG. 11                    FIG. 12

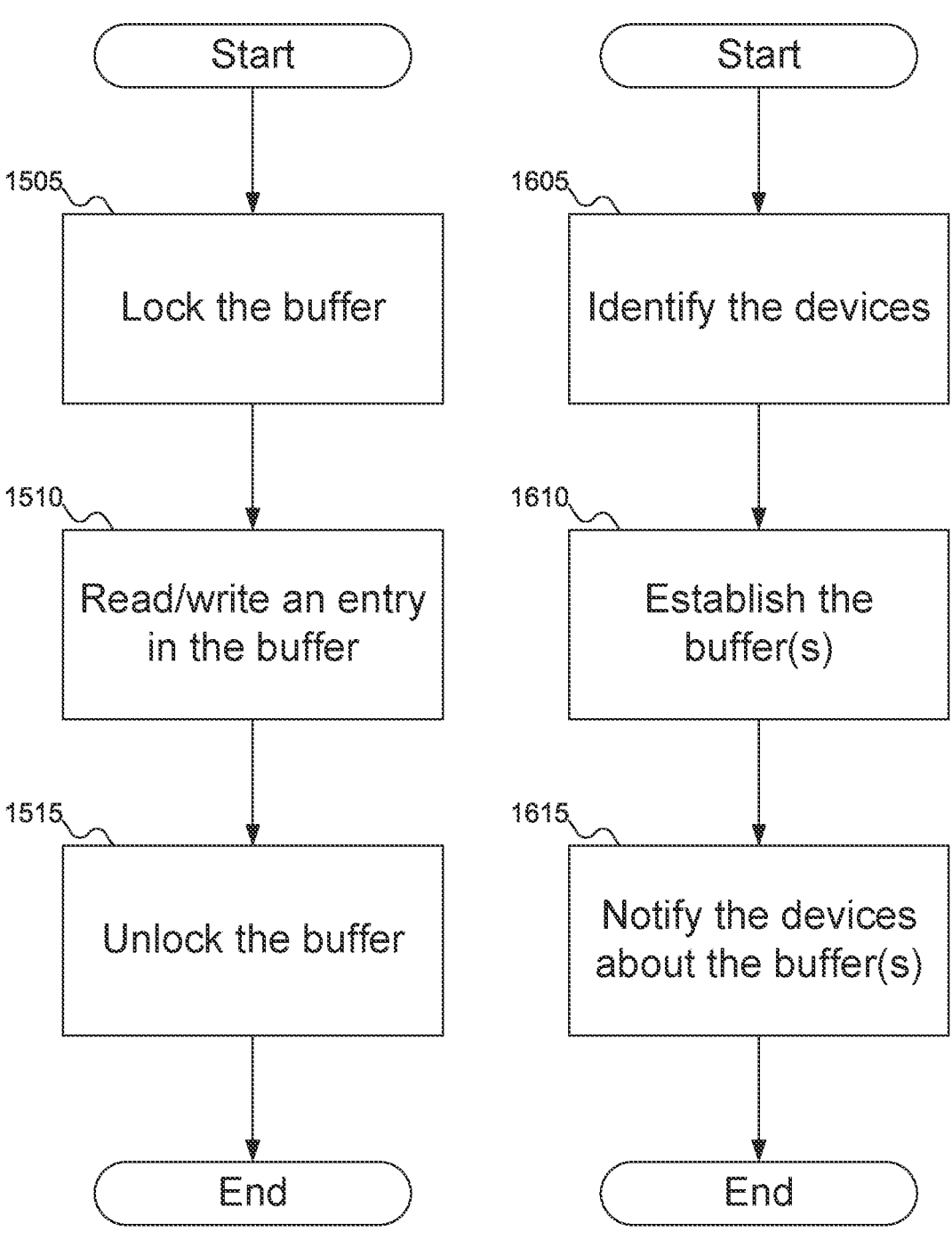
FIG. 15           FIG. 16

INTER-DRIVE COMMUNICATION FOR COOPERATIVE OPERATIONS

RELATED APPLICATION DATA

This application claims the benefit of U.S. Provisional Patent Application Ser. No. 63/547,138, filed Nov. 2, 2023, which is incorporated by reference herein for all purposes.

FIELD

The disclosure relates generally to devices, and more particularly to inter-device communication.

BACKGROUND

Devices, such as storage devices or other devices connected via a memory fabric, typically are under host control. The host processor issues requests, and the devices perform those commands. For devices to communicate, one device sends a request to the host processor, which sends the request to the other device.

A need remains to permit devices to communicate without involving the host.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

FIG. 9 shows a flowchart of an example procedure for the devices of FIG. 1 to communicate using the buffers of FIG. 3, according to embodiments of the disclosure.

FIG. 10 continues the flowchart of the example procedure of FIG. 9 for the devices of FIG. 1 to communicate using the buffers of FIG. 3, according to embodiments of the disclosure.

FIG. 11 shows a flowchart of an example procedure for the device of FIG. 1 to place an entry in the buffer of FIG. 3, according to embodiments of the disclosure.

FIG. 12 shows a flowchart of an example procedure for the device of FIG. 1 to retrieve an entry from the buffer of FIG. 3, according to embodiments of the disclosure.

FIG. 15 shows a flowchart of an example procedure for the device of FIG. 1 to place an entry in the buffer of FIG. 3 that may be read or written by more than one device of FIG. 1, according to embodiments of the disclosure.

FIG. 16 shows a flowchart of an example procedure for the processor of FIG. 1 or the devices of FIG. 1 to establish the buffers of FIG. 3, according to embodiments of the disclosure.

SUMMARY

Figure 1:
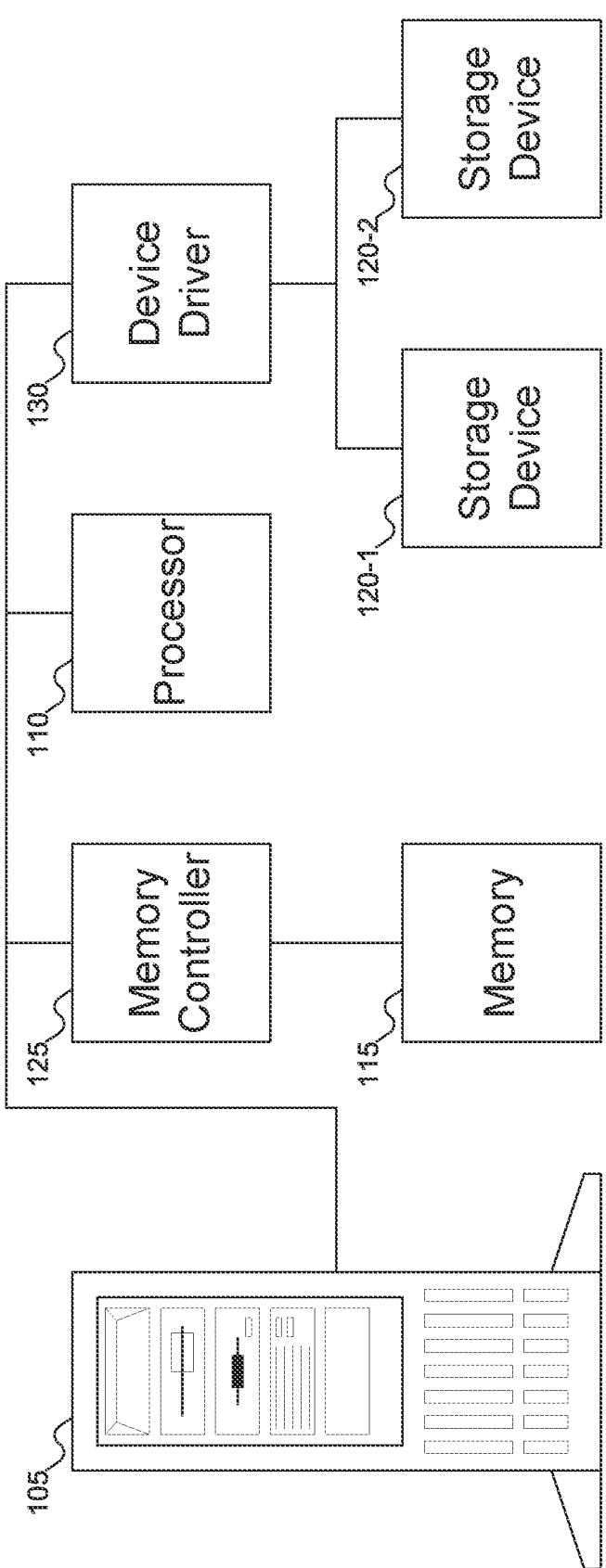
FIG. 1 shows a machine including storage devices that may support inter-device communication, according to embodiments of the disclosure.

A system may include a processor and two devices. The processor may communicate with each device, and each device may communicate with the other device.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Devices, such as storage devices, typically are under host control. A host processor may issue requests to the devices, which may then execute the requests and return the results to the host processor.

Such devices are often connected via a memory fabric. This memory fabric enables the devices and the host to exchange data. For example, the devices may read data from or write data to the main memory of the system. Similarly, to the extent that their internal storage, such as a local memory of the device, is exposed to the host processor via the memory fabric, the host processor may write data into or read data from the exposed storage of the device.

Because the devices may all be connected to the same memory fabric, the devices may all read and write to the exposed memory of other devices. But requests are different from hosts, as they may be received at queues specified for that purpose. Typically, queues come in pairs: a submission queue where the device may receive a request, and a completion queue where the device may return the result of a request.

Queues (or queue pairs) may be specific to the sending and receiving party. Because the device may not know in advance how many other devices might be connected, typically the devices manage queues (or queue pairs) only for the host processor. This fact means for one device to send a request to another device, the first device may send a request to the host, which may then send the request to the second device (both requests being sent along the appropriate queues or queue pairs).

Host processors already have processes to manage, without adding the requirement of inter-device messaging. In addition, sending messages from one device to another via the host processor may increase the latency due to the message traveling via the host processor (rather than directly between the devices).

Embodiments of the disclosure address these problems by providing a mechanism for direct inter-device communication. A buffer, such as a ring buffer, may be provided. A device may write a message to the ring buffer, and another device may read the message from the ring buffer. While ring buffers may be shared (so that more than one device might be able to write to a single read buffer, or more than one device might be able to read from a single read buffer), by establishing a ring buffer that may be written by only one device and may be read by only one device the inclusion of lock mechanisms (to avoid conflicting devices reading to or writing from a single ring buffer) may be avoided. Thus, for each pair of devices, two ring buffers may be used: one for each device to send messages to the other device. These ring buffers may be located anywhere: in the main memory, in the device that sends the message, in the device that receives the message, or a third device.

Devices may check their ring buffers using any desired logic. For example, a device might use a round robin technique to check ring buffers for messages from other devices to process next. Or, a device might look for the ring buffer with the oldest message to process next.

Such inter-device communication may be used for various purposes. For example, computational storage devices may use such inter-device communication to create a pipeline to sequentially process data as directed by the host processor. Or, devices may use inter-device communication to share analytics, and to perform system-wide wear leveling or coordinate garbage collection. Or, devices may use inter-device communication to advertise their capabilities, including their available exposed storage or computational functions. Or, devices may use inter-device communication to distribute processing requests from the host. Or, devices may use inter-device communication to allocate and manage each other's available exposed storage. Or, devices may use inter-device communication to perform data migration: for example, because one device is beginning to fail.

FIG. 1 shows a machine including storage devices that may support inter-device communication, according to embodiments of the disclosure. In FIG. 1, machine 105, which may also be termed a host or a system, may include processor 110, memory 115, and storage devices 120-1 and 120-2 (which may be referred to collectively as storage devices 120).

Processor 110 may be any variety of processor. Processor 110 may also be called a host processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), flash memory, etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115 or storage devices 120.

Storage devices 120 may be used to store data that may be termed "long-term": that is, data that is expected to be stored for longer periods of time, or that does not need to be stored in memory 115. Storage devices 120 may be accessed using device driver 130. While FIG. 1 shows two storage device 120, there may be any number (two or more) of storage devices in machine 105. And while FIG. 1 shows both storage devices 120 accessed using the same device driver 130, embodiments of the disclosure may have each storage device 120 accessible using a different device driver 130, the same device driver 130, or any combination thereof. Storage devices 120 may also be used to store data in a persistent, or non-volatile, manner: that is, in a manner that retains data even if storage devices 120 is no longer provided with power. This may be contrasted with, for example, memory 115, which is often implemented using volatile memory (such as DRAM), which may lose data if memory 115 is no longer provided with power.

Storage devices 120 may include a storage media on which data may be stored. For example, the storage media might include NAND flash memory as might be included in a Solid State Drive (SSD) or a platter that may be locally magnetized as in a hard disk drive. Storage devices 120 may also include a controller to manage writing data to and reading data from the storage media. Storage devices 120 may also include mechanism to perform the writing of data to the storage media or the reading of data from the storage media. For example, such mechanisms might include the circuitry to store or read a voltage from one or more cells in NAND flash memory, or an actuator to apply or read a magnetization of a location on a platter.

Storage devices 120 may be connected to each other, and to processor 110, using any desired method or mechanism. For example, storage devices 120 may be connected via one or more busses in machine 105. Or, storage devices 120 may include direct connections to the other storage devices 120. Embodiments of the disclosure may include any type of connection (or any combination of connections) between and/or among storage devices 120. Note that a given storage device 120 may use one bus, path, and/or protocol to communicate with processor 110 and a different bus, path, and/or protocol to communicate with another storage device 120 (and, indeed, may use different busses, paths, and/or protocols to communicate with each other storage device 120).

Depending on the ways in which processor 110 and storage devices 120 may communicate, storage devices 120 may include one or more interfaces to communicate with processor 110 and/or other storage devices 120. For example, if processor 110 and all storage devices 120 are connected via a single Peripheral Component Interconnect Express (PCIe) bus, a single interface on storage devices 120 may suffice to communicate with processor 110 and with other storage devices 120. If storage device 120 uses different mechanisms to communicate with processor 110 than with other storage devices 120, then storage device 120 may include interfaces appropriate to the communication busses, paths, and/or protocols used, and may therefore include more than one interface. Storage device 120 might potentially include up to n interfaces, where storage device 120 communicates with n−1 other storage devices and processor 110 (that is, machine 105 includes a total of n storage devices 120).

More generally, storage devices 120 may be an example of various types of devices that may benefit from inter-device communication. An example of another type of device that may benefit from inter-device communication is a computational storage unit (which may also be referred to as a computational storage device or a computational device). A computational storage unit may be a form of processing that may be performed closer to where the data is stored (on storage devices 120). To that end, a computational storage unit may include some form of processing circuitry, which may be implemented using, for example, a Field Programmable Gate Array (FPGA), an Application-Specific Integrated Circuit (ASIC), a Central Processing Unit (CPU) or other type of processor, a Graphics Processing Unit (GPU), a General Purpose GPU (GPGPU), a Tensor Processing Unit (TPU), a Neural Processing Unit (NPU), or any other desired form of implementation. Such implementations may include one or more preprogrammed functions: for example, functions to filter data, encrypt or decrypt data, compress or decompress data, etc. Such implementations may also support custom functions that may be downloaded into the processing circuitry of the computational storage unit, so that the functionality of the computational storage unit may be modified as needed by applications. In some embodiments of the disclosure, a computational storage unit and a storage device may be combined into a single unit, offering both storage and computational capabilities.

Embodiments of the disclosure may include any desired mechanism to communicate with devices 120. For example, devices 120 may connect to one or more busses, such as a PCIe bus, or devices 120 may include Ethernet interfaces or some other network interface. Other potential interfaces and/or protocols to devices 120 may include Non-Volatile Memory Express (NVMe), NVMe over Fabrics (NVMe-oF), Remote Direct Memory Access (RDMA), Transmission Control Protocol/Internet Protocol (TCP/IP), Universal Flash Storage (UFS), embedded MultiMediaCard (eMMC), InfiniBand, Serial Attached Small Computer System Interface (SCSI) (SAS), Internet SCSI (iSCSI), Serial AT Attachment (SATA), and cache-coherent interconnect protocols, such as the Compute Express Link® (CXL®) protocols, among other possibilities. (Compute Express Link and CXL are registered trademarks of Compute Express Link Consortium, Inc.) As noted above, storage devices 120 may include as many interfaces as needed to support communications using as many interfaces, protocols, and/or paths as desired.

While FIG. 1 uses the generic term "storage device", embodiments of the disclosure may include any storage device formats (or, more generally, devices formats) that may benefit from inter-device communication, examples of which may include hard disk drives, SSDs, or computational storage units. Any reference to any particular type of device 120, such as a reference to "SSD", should be understood to include such other embodiments of the disclosure.

Figure 2:
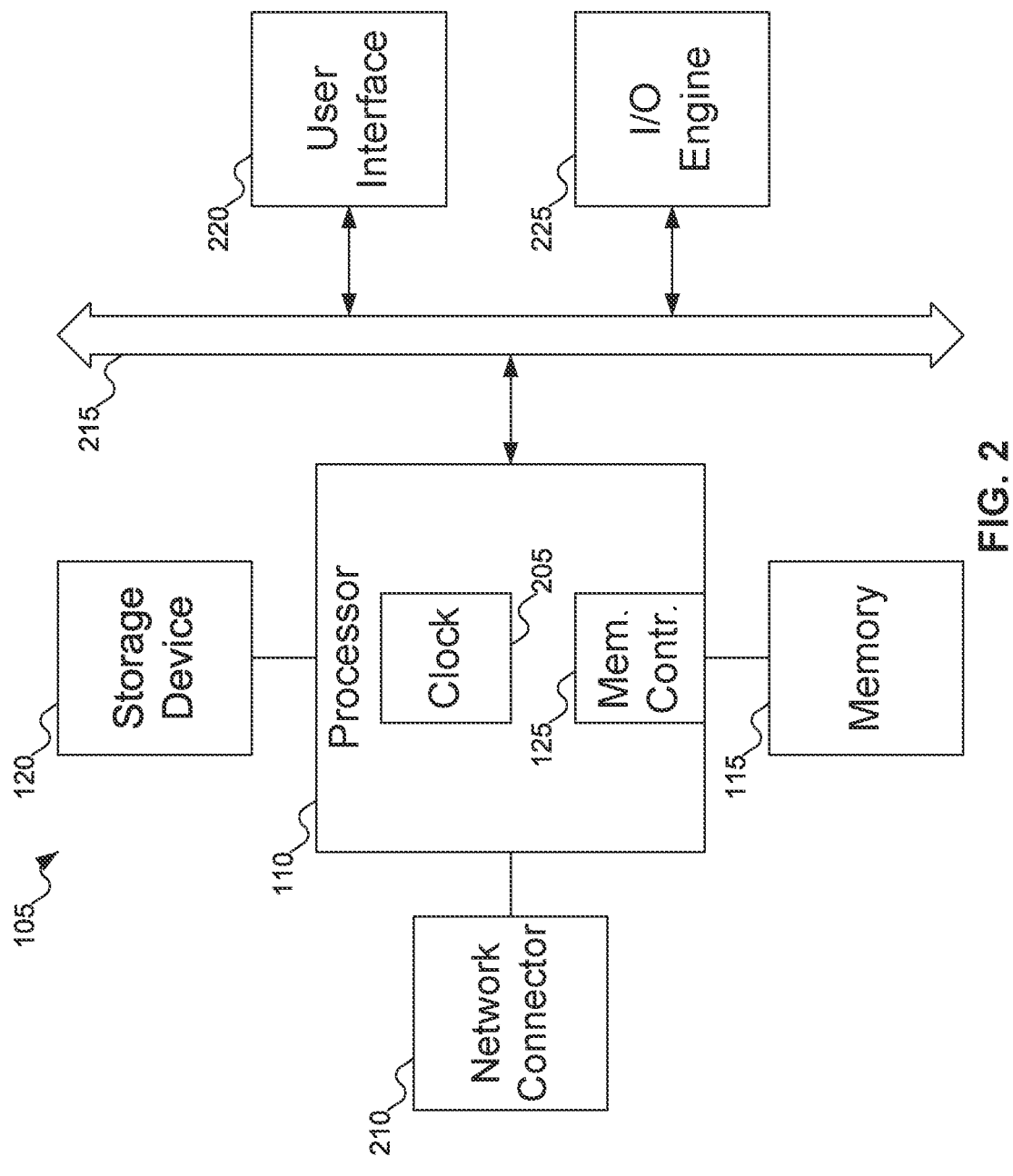
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
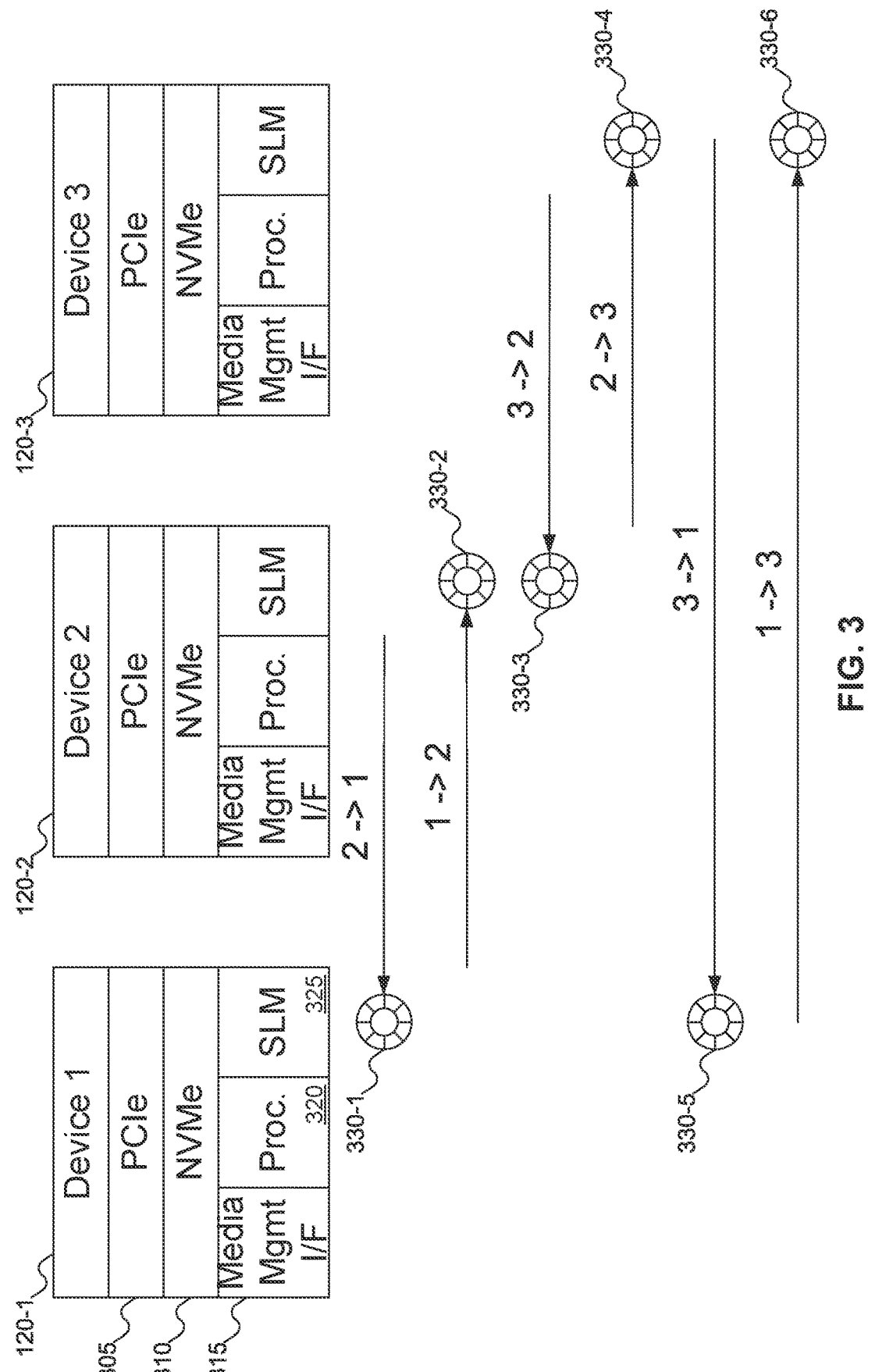
FIG. 3 shows three devices of FIG. 1 using buffers to communicate with each other, according to embodiments of the disclosure.

FIG. 3 shows three devices 120 of FIG. 1 using buffers to communicate with each other, according to embodiments of the disclosure. In FIG. 3, three devices 120-1, 120-2, and 120-3 are shown. Device 120, as illustrated by device 120-1, may include a Peripheral Component Interconnect Express (PCIe) layer 305, which may communicate with processor 110 of FIG. 1 (and other devices 120) via a PCIe bus using PCIe protocols. In embodiments of the disclosure where other forms of communication than across a PCIe bus are used, PCI layer 305 may be replaced with another appropriate layer. In embodiments of the disclosure where multiple busses, protocols, and/or paths are used by device 120-1 to communicate with devices 120-2 and 120-3 and/or processor 110 of FIG. 1, PCIe layer 305 may be used as well as another layer appropriate for another bus, protocol, and/or path. That is, device 120-1 may include multiple interfaces to support communications using different busses, protocols, and/or paths.

Device 120 may also include a Non-Volatile Memory Express (NVMe) layer 310, which may enable communication with processor 110 of FIG. 1 (and other devices 120) using NVMe protocols over the PCIe bus. Device 120 may also include media management interface 315, which may be used to access data from a storage media. Device 120 may also include processor 320 (which may be referred to as a computational storage processor, to distinguish it from processor 110 of FIG. 1), which may enable device 120 to act as both a storage device and a computational storage unit. PCIe layer 305, NVMe layer 310, and media management interface 315 may be implemented, individually, collectively, or in any desired combination, using any desired circuit, controller, FPGA, ASIC, or other desired element. PCIe layer 305, NVMe layer 310, and media management interface 315, individually or collectively, may also be implemented as software executing on processor 320.

Finally, device 120 may also include subsystem local memory (SLM) 325, which may act as local memory that may be used by computational storage processor 320 in carrying out its operations. SLM 325 may be implemented using any desired form of volatile and/or non-volatile memory, such as DRAM, SRAM, flash memory, etc.

Within SLM 325, each device 120 may include a buffer. For example, device 120-1 may include buffers 330-1 and 330-5, device 120-2 may include buffers 330-2 and 330-3, and device 120-3 may include buffers 330-4 and 330-6. Buffers 330-1 through 330-6 may be referred to collectively as buffers 330. By virtue of being in SLM 325 of devices 120, each device 120 may read from or write data to SLM 325 of the other devices 120, via the underlying bus (such as a PCIe bus). Any desired mechanism for accessing SLM 325 of the other devices 120 may be used: for example, memory fabrics, including PCIe, CXL, Remote Direct Memory Access (RDMA), and NVLink®, may support accessing memory of another device 120 along the fabric (NVLink is a registered trademark of NVIDIA Corporation). Buffers 330 may therefore be used for inter-device communication.

Buffers 330 may take any desired form. In some embodiments of the disclosure, buffers 330 may be First-In, First Out (FIFO) queues. FIFO queues may help to ensure that the oldest entries in the FIFO queue are retrieved first. Any other desired queue structures may also be used. FIFO queues are discussed further with reference to FIG. 4 below.

In some embodiments of the disclosure, each buffer 330 is specific for communications between a particular pair of devices 120, and in a particular direction. Thus, for example, buffer 330-1 of device 120-1 may be used to receive messages or requests from device 120-2 and buffer 330-5 of device 120-1 may be used to receive messages or requests from device 120-3, buffer 330-2 of device 120-2 may be used to receive messages or requests from device 120-1 and buffer 330-3 of device 120-2 may be used to receive messages or requests from device 120-3, and buffer 330-4 of device 120-3 may be used to receive messages or requests from device 120-2 and buffer 330-6 of device 120-3 may be used to receive messages or requests from device 120-1. By using a unique buffer 330 for communication from one particular device 120 to another particular device 120 (with communication in the other direction handled by another buffer 330), embodiments of the disclosure may avoid critical sections (where two devices 120 might attempt to use buffer 330 at the same time). The consequence of using a single buffer 330 for one-way communication between a particular pair of devices 120 is that the number of buffers 330 may grow quadratically with the number of devices 120. For example, two devices 120 may need two buffers 330 to communicate, three devices 120 may need six buffers 330 to communicate, four devices 120 may need 12 buffers 330 to communicate, and so on. As a general rule, the number of buffers n required to support all manner of communication among d devices may be expressed as $$n = 2 \times \binom{d}{2} = 2 \times \frac{d \times (d-1)}{2} = d \times (d-1).$$

(The reason $$n = 2 \times \binom{d}{2}$$

is because there are $$\binom{d}{2}$$

pairs of devices 120, and one buffer 330 may be used for communication in each direction, resulting in two buffers 330 per pair of devices 120.)

In FIG. 3, each device 120 is shown as including buffers 330 used to receive messages or requests from other devices 120. For example, buffer 330-1 is used for messages or requests received from device 120-2, buffer 330-2 is used for messages or requests received from device 120-1, and so on. Having each device 120 include the buffers 330 used to receive messages or requests from other devices 120 is one way to organize buffers 330. But other embodiments of the disclosure may organize buffers 330 in other ways. For example, some embodiments of the disclosure may have buffers 330 stored in SLM 325 of devices 120 that are sending the messages or requests (rather than receiving them). Other embodiments of the disclosure may have buffers 330 stored in memory 115 of FIG. 1. Still other embodiments of the disclosure may have all buffers 330 stored in one device 120 (with every device 120 accessing SLM 325 of the one device 120 that stores buffers 330). Still other combinations are possible, and embodiments of the disclosure may include organizing and storing buffers 330 in any desired locations within machine 105 of FIG. 1.

As mentioned above, buffers 330 may be used to issue requests from one device 120 to another device 120. In some embodiments of the disclosure, such requests may be placed in entries in buffer 330 that may take a form similar to a submission queue entry (SQE), as may be used by processor 110 of FIG. 1 to issue requests to devices 120. In addition, upon one device 120 completing such a request, the device 120 that executed the request may issue a response to the requesting device 120, letting the requesting device 120 know that the request has completed. Such a response may be placed in an entry in buffer 330 that may take a form similar to a completion queue entry (CQE), as may be returned from device 120 to processor 110 of FIG. 1 upon completing a request from processor 110 of FIG. 1.

Note that buffer 330 may include both types of entries: buffer 330 may include requests from the other device 120 to be executed by the receiving device 120, as well as responses from the other device 120 to requests issued by the device 120. So, for example, buffer 330-1 may include both requests sent from device 120-2 to device 120-1 as well as responses to requests made of device 120-2 by device 120-1 (such requests would have been placed in buffer 330-2 by device 120-1).

As noted above, by having a unique buffer 330 for communication from one device 120 to another device 120, critical sections may be avoided. A critical section may be a mechanism by which a buffer 330 may be locked for use by a particular device 120: any other device 120 attempting to access that buffer 330 may wait until the lock is released. So, for example, a single buffer 330 may be used for all communications between two devices 120, regardless of the direction of the communication. But to prevent both devices 120 attempting to write to the single buffer 330 at the same time, a lock mechanism may be used. Whichever device 120 holds the lock may write to the single buffer 330, and the other device 120 may block until the lock is released. Any desired form of lock mechanism may be used to ensure that only one device 120 may write to a single buffer 330 at a time. With multiple devices placing requests in a single buffer 330, each device 120 may include in the entries in buffer 330 an identifier of device 120 that sent the message or request, so that the receiving device 120 may know which device 120 issued the request. Thus, embodiments of the disclosure may include locks if appropriate or desired for the implementation.

In a similar manner, multiple devices 120 may read entries from a single buffer 330. That is, a single device 120 might place messages or requests to multiple devices 120, with all such messages or requests placed in entries in a single buffer 330. This shared buffer 330 may be located anywhere desired: for example, in memory 115 of FIG. 1 or in SLM 325 of any of devices 120. The various devices 120 to which such messages or requests are intended may then read those entries from buffer 330. Again, to prevent multiple devices 120 from accessing buffer 330 at the same time, a lock mechanism may be used to ensure that two different devices 120 may not attempt to read and execute the same message from an entry in buffer 330.

In embodiments of the disclosure where multiple devices 120 may write to a single buffer 330, the entries in buffer 330 may be modified to reflect which device 120 wrote the entry. In embodiments of the disclosure where multiple devices 120 may read from a single buffer 330, the entries in buffer 330 may be modified to reflect for which device 120 the entry is intended. Note that these embodiments may also be combined: in the most general case, there might be just one buffer 330, which all devices 120 may both write to and read from. In the remainder of this document, the discussion will focus on embodiments of the disclosure where each device 120 may write to a unique buffer 330 for communicating with another device 120 (as illustrated in FIG. 3), but other embodiments of the disclosure may be understood to be covered as well.

Even in embodiments of the disclosure where each storage device 120 sends messages to another storage device using a unique buffer 330 (such as the embodiment shown in FIG. 3), the question might arise whether storage devices might deadlock. That is, the question might arise whether storage device 120-1 might be waiting for storage device 120-2 to execute a request from buffer 330-2, and storage device 120-2 might be waiting for storage device 120-1 to execute a request from buffer 330-1. With each storage device 120 waiting for the other, neither might be doing any processing. The answer to this question would be "no", for several reasons. First, processors 320 may be able to handle several requests from buffers 330 at one time, much like how storage devices 120 may read and execute multiple SQEs from machine 105 of FIG. 1 at the same time. For example, as discussed with reference to FIG. 4 below, devices 120 may be able to process requests in buffers 330 other than the oldest request in buffers 330 (that is, other than at the head of the line in buffers 330). Second, processors 320 may track the status of requests issued to other storage devices 120. If a request effectively times out due to lack of response, processors 320 may conclude that the other storage device 120 is not functioning, may be treat the request issued to that storage device 120 as not completed, and may continue in any desired manner (for example, potentially informing machine 105 of FIG. 1 that the original request that lead to the inter-device request could not be completed successfully).

It is worth noting that buffers 330 are used as a communication path between storage devices 120. Storage devices 120 may continue to communicate with processor 110 of FIG. 1 in any desired manner. For example, storage devices 120 may use queues, such as submission queue/completion queue pairs, which may be stored in, for example, memory 115 of FIG. 1, as a communication path with processor 110 of FIG. 1, to receive requests from processor 110 of FIG. 1 and to send responses to processor 110 of FIG. 1.

Figure 4:
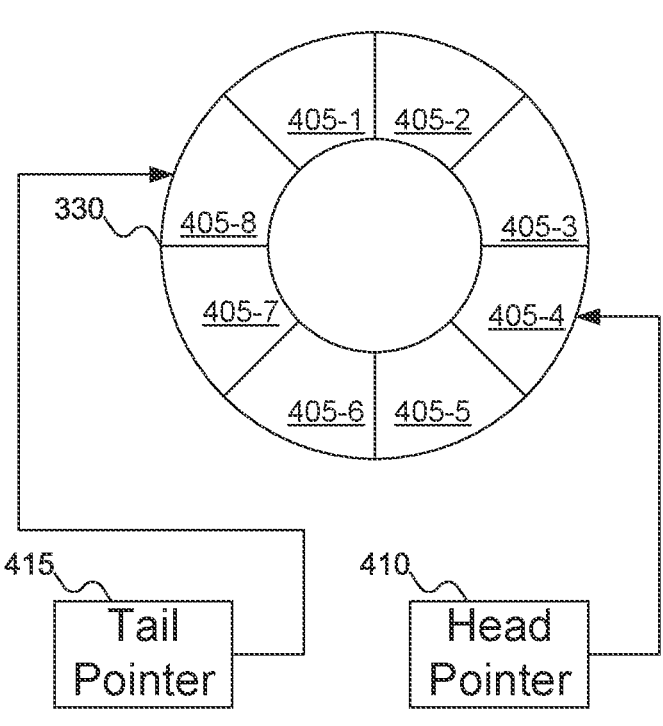
FIG. 4 shows details of one of the buffers of FIG. 3, according to embodiments of the disclosure.

FIG. 4 shows details of buffers 330 of FIG. 3, according to embodiments of the disclosure. In FIG. 4, buffer 330 is shown as a ring buffer. A ring buffer is a buffer that is circular: the "last" entry in the ring buffer is followed by the "first" entry in the ring buffer. Using a ring buffer, there may be no concern about going past "the end" of the buffer. Buffer 330 is shown as including eight entries 405-1 through 405-8 (which may be referred to collectively as entries 405).

A ring buffer may be implemented, for example, as an array of addresses in memory. If the base address of the ring buffer is b, each entry 405 has a size e, and the total number of entries 405 in the ring buffer is n, then the address of the $i^{th}$ entry 405 in the ring buffer may be calculated as $a_i = b + ((i-1)*e)$ (this assumes that the first entry 405 is called entry 405 one: if entries 405 are counted starting at zero, then $(i-1)$ may be replaced with i in the above equation). More importantly, given the address for entry 405 i (which may be referred to as $a_i$), the address for the next entry 405 in the ring buffer (which would be the first entry if the current entry is the last entry in the ring buffer) may be calculated as $a = ((a_i + e - b) \% (n*e)) + b$, where % is the modulo operator. Using this equation, sending device 120 does not need to determine which entry 405 was last used and check to see if that entry 405 is the "last" entry 405 in the ring buffer: sending device 120 may calculate the address for the next entry 405, with wrapping around from the "last" entry 405 to the "first" entry 405 happening automatically.

It is also possible to calculate the address of entry 405 in the ring buffer for the $k^{th}$ packet written to the ring buffer. Again, if the base address of the ring buffer is b, each entry 405 has a size e, and the total number of entries 405 in the ring buffer is n, then the address where the $k^{th}$ packet may be written to the ring buffer may be calculated as $a_k = b + ((k-1) \% n)*e$.

Note that these last two equations assume that packets are always added to and removed from the ring buffer in the same order, without creating any gaps in the sequence. In embodiments of the disclosure where packets may be removed from the ring buffer out of order, the entries 405 determined by these equations might not be "open" to store a new packet, in which case the ring buffer may be searched for the next open entry 405.

Buffer 330 may also include two additional pointers. Head pointer 410 may track the entry that is at the "head" of the line in buffer 330 (that is, entry 405 that was placed in buffer 330 first). Tail pointer 415 may track the entry that is at the "tail" of the line in buffer 330 (that is, entry 405 that was placed in buffer 330 last). Sending device 120 may use tail pointer 415 to determine which entry 405 may next be used to send a message to receiving device 120, and receiving device 120 may use head pointer 410 to determine which entry 405 to next retrieve. Note that the terminology may be interchanged, depending on the implementation. The names for pointers 410 and 415 is less important than how they are used.

Both sending device 120 and receiving device 120 may access head pointer 410 and tail pointer 410. Sending device 120 may update tail pointer 415 after adding a new entry 405 to buffer 330, and receiving device 120 may update head pointer 410 after retrieving an entry 405 from buffer 330. But note that sending device 120 may also access head pointer 410, and receiving device 120 may also access tail pointer 415. For example, sending device 120 may check to see that there is room for a new entry 405 in buffer 330. If sending device 120 does not perform such a check, then sending device 120 might overwrite an existing entry 405 that has not yet been processed by receiving device 120. Sending device 120 may determine whether there is room for a new entry 405 in buffer 330 by comparing head pointer 410 and tail pointer 415: if head pointer 410 points to the entry 405 immediately following the entry 405 pointed to by tail pointer 415, then buffer 330 is full, and sending device 120 should wait until receiving device 120 has removed an entry from buffer 330. Once there is room for a new entry 405 in buffer 330, sending device 120 may store the appropriate information in entry 405 of buffer 330. Similarly, receiving device 120 may check to see if there are any entries 405 in buffer 330 that have not yet been processed. If receiving device 120 does not perform this check, then receiving device 120 might read data from an entry 405 that was previously processed (and should not be processed again). Receiving device 120 may determine whether buffer 330 is empty by comparing head pointer 410 and tail pointer 415: if head pointer 410 and tail pointer 415 both point to the same entry 405, then buffer 330 is currently empty and receiving device 120 should not attempt to retrieve an entry 405 from buffer 330.

Note that the above description for buffer 330 suggests that the receiving device 120 may only remove entry 405 pointed to by head pointer 410. In some embodiments of the disclosure, this implementation is intentional. But other embodiments of the disclosure may support removing any entry 405 from buffer 330, not just entry 405 pointed to by head pointer 410. For example, an auxiliary array may be included, which may include a value indicating whether or not storage device 120 of FIG. 1 has processed the corresponding entry 405. This auxiliary array may identify whether a particular entry 405 in buffer 330 contains a message or request waiting for processing or not. Head pointer 410 may be arranged to always point to the oldest entry 405 in buffer 330 that contains a message or request waiting for processing. Thus, when entry 405 in buffer 330 pointed to by head pointer 410 is removed, head pointer 410 may be moved to the next entry 405 in buffer 330 that is waiting processing: this entry 405 may be any number of entries 405 down buffer 330, rather than the next entry 405 in buffer 330. The receiving device 120 may increment head pointer 410 to point to the next entry 405 in buffer 330 repeatedly until head pointer 410 points to an entry 405 that the auxiliary list indicates contains a message or request awaiting processing. Because an entry in the auxiliary list may only need to indicate whether the corresponding entry 405 in buffer 330 contains a message or request awaiting processing, the auxiliary list may only need one bit per entry 405 in buffer 330, which keeps the auxiliary list small in size.

In case this is not clear, consider the following. Accompanying buffer 330 may be an array of bits (not shown in FIG. 4): one bit for each entry 405 in buffer 330. This bit may be set, for example, to one to indicate that the corresponding entry 405 in buffer 330 includes a request (or response) waiting to be processed. When storage device 120 of FIG. 1 removes a request (or response) from an entry 405 in buffer 330 other than the one pointed to by head pointer 410, storage device 120 of FIG. 1 may change the bit in the auxiliary array corresponding to that entry 405 in buffer 330 to zero, to indicate that the corresponding entry 405 in buffer 330 has been processed. Then, when storage device 120 is ready to change head pointer 410 (because the entry 405 in buffer 330 pointed to by head pointer 410 has been processed), storage device 120 of FIG. 1 may set the bit in the auxiliary array corresponding to that entry 405 in buffer 330 to zero, locate the next bit in the auxiliary array set to one, and adjust head pointer 410 to point to entry 405 in buffer 330 that corresponds to the bit in the auxiliary array so identified as set to one. (Obviously, the significance of the values zero and one may be interchanged without any loss of applicability.)

While using an array of memory addresses is one way to implement buffer 330, embodiments of the disclosure may use other implementations as well. For example, buffer 330 may be implemented as a linked list, where head pointer 410 points to the first entry 405 in the list, tail pointer 415 points to the last entry 405 in the list, and every entry 405 in the list (except for the last entry 405) points to its successor entry 405. Linked lists may avoid using modulo arithmetic to determine the address for the next entry, and may also be unbounded (except by the capacity of subsystem local memory 325 of FIG. 3). When sending device 120 needs to place a new entry 405 in the linked list, sending device 120 may allocate a block of memory for the new entry 405, place the appropriate data in the new entry 405, then add the new entry to the linked list (by having both the entry 405 pointed to by tail pointer 415 and tail pointer 415 itself point to the new entry 405, and having the new entry 405 include a null pointer for its successor). When receiving device 120 wants to read data from an entry 405 in the linked list, receiving device 120 may verify that the entry exists by checking that head pointer 410 is not a null pointer: if so, receiving device 120 may read the data from the entry 405 pointed to be head pointer 410, then may update head pointer 410 to point to the successor entry 405 of the entry 405 that was pointed to be head pointer 410 and deallocating the memory used by the (now processed) entry 405.

A benefit of a linked list structure (or any queue structure that does not dictate a particular order in which elements are retrieved, such as the modified buffer 330 using an auxiliary list) is that multiple devices 120 may consume entries 405 from buffer 330. That is, one (or more) sending devices 120 may place entries 405 in buffer 330 intended for different recipient devices 120. The recipient devices 120 may then determine which entries 405 in buffer 330 contain messages or requests intended for that device, and may remove that entry 405 (or those entries 405) by changing the bit in the auxiliary list. Head pointer 410 may be updated only if the entry 405 in buffer 330 pointed to by head pointer 410 is being consumed.

While the above descriptions suggest that the auxiliary list might be used only to indicate whether a particular entry 405 in buffer 330 is waiting to be processed, the auxiliary list may also include additional information. Since the auxiliary list may act as metadata, other metadata for entries 405 in buffer 330 may also be included in the auxiliary list. For example, rather than including identifiers of the sending device 120 and/or the receiving device 120 in entries 405 in buffer 330, such identifiers (as well as other metadata) may be placed in the auxiliary list instead. Using the auxiliary list in this manner may simplify scanning of buffer 330, since the individual entries 405 in buffer 330 do not need to be directly accessed to determine who sent the message or request or who is intended to receive the message or request.

The above discussion suggests that each entry in buffers 330 is the same size, and each buffer 330 has the same number of entries. In some embodiments of the disclosure, this condition is true. But in other embodiments of the disclosure, this condition may be relaxed. For example, based on the different computational functions offered by devices 120, larger sized entries may be needed, or smaller sized entries may be sufficient, and different buffers may use entries of different sizes. Generalized even further, it is possible that each entry in a single buffer 330 might be of a different size (the size of each entry might be stored, for example, in an auxiliary list, so that the receiving device 120 may know how much data to read from buffer 330). In addition, different buffers 330 might have different numbers of entries, depending on how busy a particular device 120 may expect to be in processing inter-device communications. A device 120 that only functions as a storage device, for example, might be satisfied with a buffer 330 that has fewer entries than a device 120 that offers multiple computational functions that may be used in parallel. The size of the entries in a buffer 330 (assuming each entry in the buffer 330 is the same size) and the number of entries in a buffer 330 may be communicated to other devices that need such information after the buffer 330 is established.

Figure 5:
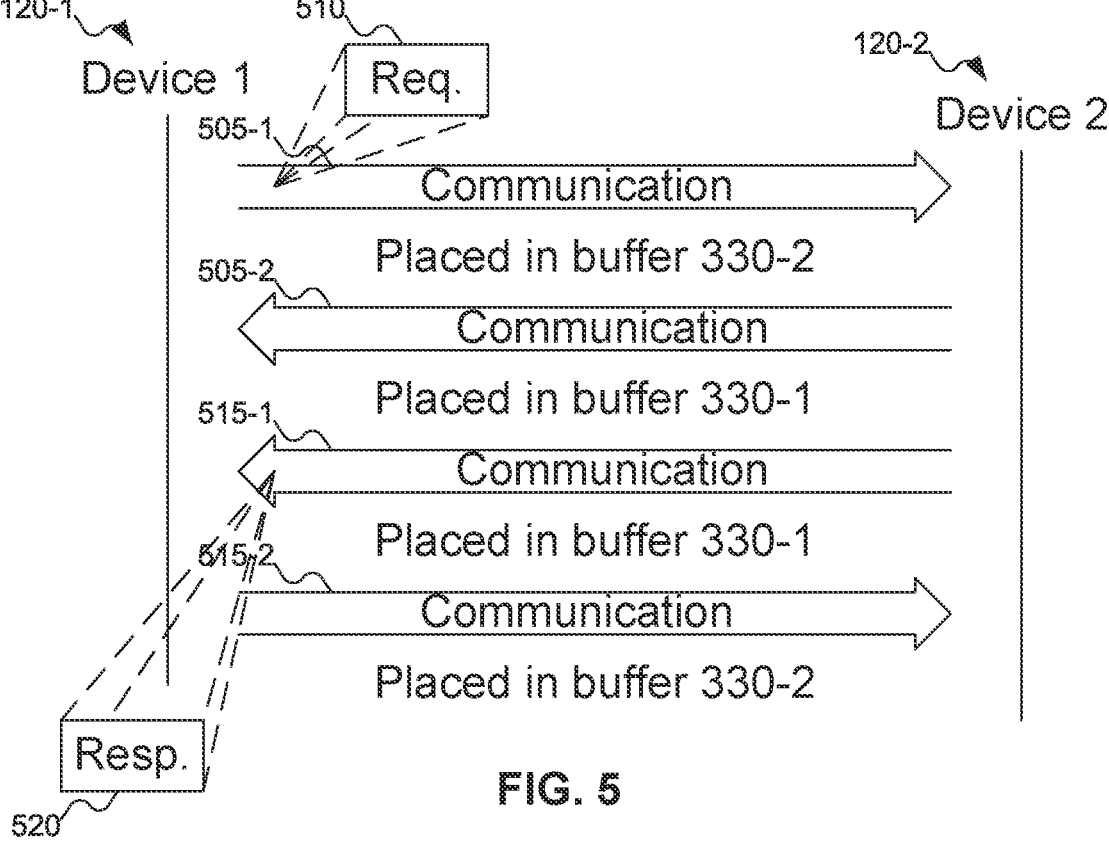
FIG. 5 shows communications between two devices of FIG. 1 using the buffers of FIG. 3, according to embodiments of the disclosure.

FIG. 5 shows communications between two devices 120 of FIG. 1 using buffers 330 of FIG. 3, according to embodiments of the disclosure. In FIG. 5, device 120-1 may send message 505-1 to device 120-2. Message 505-1 may be, for example, a request to perform some processing. Message 505-1 may be placed in a request packet structure 510, which may be placed in buffer 330-2 of FIG. 3.

Device 120-2 may also send message 505-2 to device 120-1. Message 505-2 may be placed in a request packet structure (not shown in FIG. 5), which may be placed in buffer 330-1 of FIG. 3. Note that in this example, message 505-2 may be a separate request for device 120-1 to perform some processing on behalf of device 120-2. Therefore, as shown, it is possible for two devices to each issue requests of the other.

This may lead to a question: won't each device 120 block until the other device 120 completes the request made of it by the other device 120? The answer to this question is no, for several reasons. First, there is no reason to think that one device 120 needs a response from the other device 120 to perform any substantive processing. For example, as discussed with reference to FIG. 8 below, one device 120 may send a request to another device 120 as part of a processing pipeline, and only needs a response to send its own response to the device 120 (or processor 110 of FIG. 1) that issued a request to that device 120. Second, devices 120 are capable of handling multiple requests (either from processor 110 of FIG. 1 or from other devices 120) in parallel, and therefore would not block until a response to messages 505-1 and 505-2 (which may be referred to collectively as messages 505) are received. Thus, the only situation where each device 120 might block even partially is where each device 120 requests the other device 120 to process something relating to the same data. That is, device 120-1 needs data A from device 120-2 to process data B, but device 120-2 needs data B from device 120-1 to process data A. This is an unlikely situation, and even then would only affect the processing of the data in question (and the return of that data to the requesting application(s)).

In FIG. 5, device 120-2 is assumed to finish processing message 505-1 first. Device 120-2 may then send response 515-1. Response 515-1 may be placed in a response packet structure 520, which may be placed in buffer 330-1 of FIG. 3 for return to device 120-1. Then, device 120-1 may finish processing message 505-2, which may then send response 515-2 (which may be placed in a response packet structure not shown in FIG. 5), which may be placed in buffer 330-2 of FIG. 3). Responses 515-1 and 515-2 may be referred to collectively as responses 515.

Note that FIG. 5 is merely showing an example of two messages 505 and two responses 515 involving two devices 120. As discussed above, embodiments of the disclosure may include any number of devices 120, each of which may send any number of messages 505. While FIG. 5 suggests that each message 505 may include a corresponding response 515, and this implementation has its benefits (for example, there would be concern about whether a particular request was completed or not if a response 515 were not sent), embodiments of the disclosure may only send a response 515 where any data or information needs to be returned to the requesting device 120: if no such data or information needs to be returned, then response 515 may be omitted.

One point that has not been discussed is how devices 120 may be alerted to the fact that messages 505 or responses 515 have been placed in buffers 330 of FIG. 3. In some embodiments of the disclosure, devices 120 may periodically check buffers 330 of FIG. 3 that devices 120 use to receive messages 505 or responses 515. If a message 505 or a response 515 is waiting in one of buffer 330 of FIG. 3, device 120 may dequeue that message 505 or response 515 to process it. Hardware interrupts or doorbells may also be used to minimize polling of buffers 330 of FIG. 3 to check for new messages.

As each device 120 may have more than one buffer 330 it uses to receive communications, devices 120 may use any desired strategy to determine from which buffer 330 a communication should be dequeued. For example, device 120 might use a round robin strategy, accessing each buffer 330 in a particular order and dequeuing the next communication from that buffer 330. Or, device 120 might check each buffer 330, determine which buffer 330 has the oldest pending communication, and dequeue that communication from the appropriate buffer 330. Embodiments of the disclosure may also use any other desired mechanism for selecting buffer 330 for dequeuing a communication.

Figure 6:
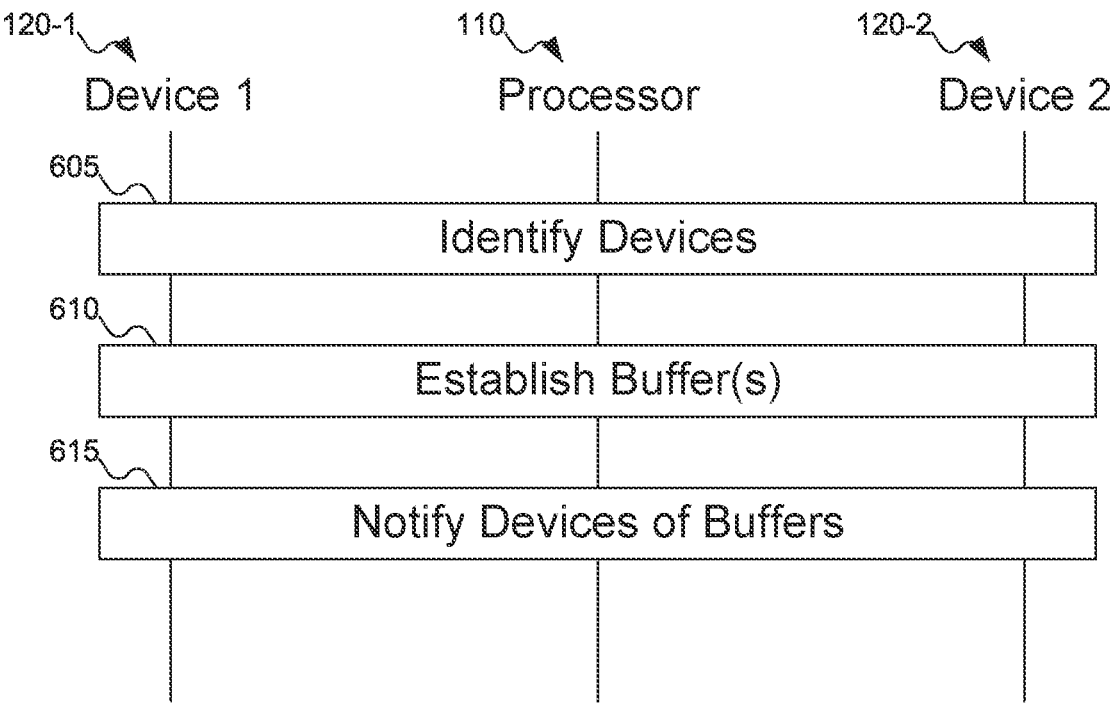
FIG. 6 shows the processor of FIG. 1 and the devices of FIG. 1 establishing the buffers of FIG. 3 for inter-device communication, according to embodiments of the disclosure.

FIG. 6 shows processor 110 of FIG. 1 and devices 120 of FIG. 1 establishing buffers 330 of FIG. 3 for inter-device communication, according to embodiments of the disclosure. In FIG. 6, at operation 605 in establishing buffers 330 of FIG. 3 is to identify devices 120. Devices 120 may be identified either by devices 120 advertising their existence, or by some component broadcasting a discovery message, asking all devices 120 to respond. Once all devices are identified, at operation 610 buffers 330 of FIG. 3 may be established. As discussed above, in some embodiments of the disclosure two buffers 330 of FIG. 3 are established for each pair of devices 120 (so that each device may send communications to the other device); in other embodiments of the disclosure, where devices 120 might share buffers 330 of FIG. 3 for sending or receiving communications, fewer buffers 330 may be established. Operation 610 may include, for example, allocating space in memory 115 of FIG. 1 or SLM 325 of FIG. 3 of one, some, or all devices 120 for buffers 330 of FIG. 3, as well as for head pointer 410 of FIG. 4 and tail pointer 415 of FIG. 4 for each buffer 330 of FIG. 3 (and initializing head pointer 410 of FIG. 4 and tail pointer 405 of FIG. 4 for each buffer 330 of FIG. 3). Finally, at operation 615, devices 120 may be notified about the buffers 330 of FIG. 3 applicable to it: which buffers 330 of FIG. 3 may be used by a device 120 to send communications to other devices 120 (and to which other devices 120), and which buffers 330 of FIG. 3 by a device 120 to receive communications from other devices 120 (and to which other devices 120). Operation 615 may include, for example, notifying each device 120 about the base address of buffers 330 of FIG. 3 and/or the addresses of head pointer 410 of FIG. 4 and tail pointer 415 of FIG. 4. (Note that in embodiments of the disclosure where the size of entries 405 of FIG. 4 and the number of entries 405 of FIG. 4 in buffer 330 of FIG. 3 is known to the applicable devices 120, the addresses of head pointer 410 of FIG. 4, tail pointer 415 of FIG. 4, may be sufficient information for devices 120 to use buffers 330 of FIG. 3, as the addresses of entries 405 of FIG. 4 may be determined from this information.) This notification may be performed, for example, by using a Base Address Register (BAR), a controller memory buffer (CMB), or a persistent memory region (PMR), among other possibilities.

A careful reader may note that the above discussion is agnostic about which element(s) perform operations 605, 610, and 615. This choice is intentional, as different implementations may have different elements performing these operations. For example, in some embodiments of the disclosure, processor 110 may be responsible for performing operations 605, 610, and 615: that is, processor 110 may be responsible for identifying devices 120, establishing buffers 330 of FIG. 3, and notifying devices 120 about buffers 330 of FIG. 3. In other embodiments of the disclosure, processor 110 might be responsible for performing operation 605, then inform devices 120 as desired to perform operations 610 and 615. In still other embodiments of the disclosure, devices 120 might each be independently responsible for performing operations 605, 610, and 615 (but operations 610 and 615 might be limited to particular buffers 330 of FIG. 3: for example, each device 120 might be responsible only for establishing buffers 330 of FIG. 3 that each device 120 uses to receive communications from other devices 120). In still other embodiments of the disclosure, one device 120 might be responsible for all of operations 605, 610, and 615, establishing all buffers 330 of FIG. 3 in that device's SLM 325 of FIG. 3 (that is, one device 120 stores all buffers 330 of FIG. 3). Embodiments of the disclosure are intended to cover all such variations on which elements perform operations 605, 610, and 615 individually.

Figure 7:
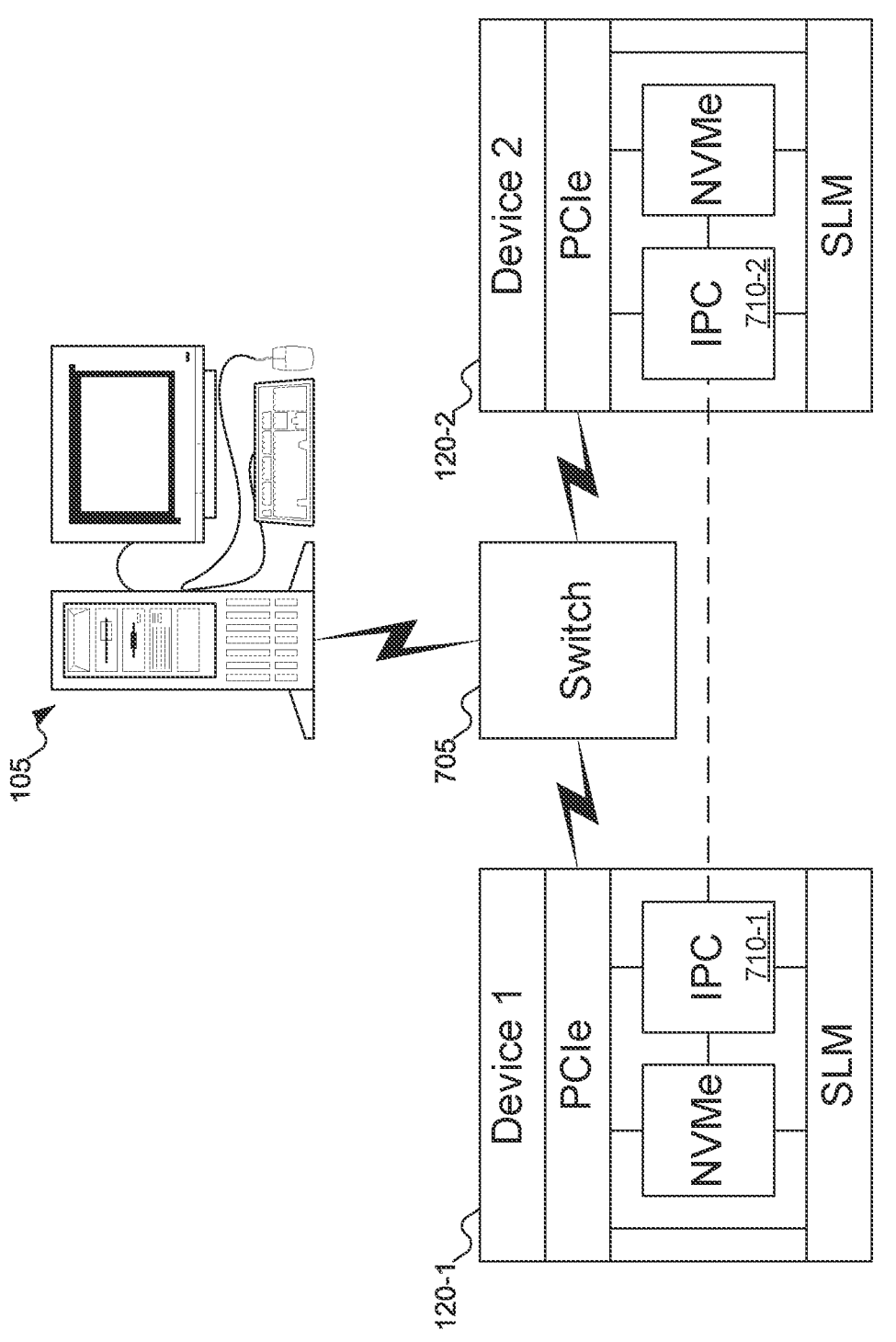
FIG. 7 shows the devices of FIG. 1 communicating through a switch, according to embodiments of the disclosure.

FIG. 7 shows devices 120 of FIG. 1 communicating through a switch, according to embodiments of the disclosure. In FIG. 7, devices 120-1 and 120-2 may connect to each other and to machine 105 via switch 705. In such an implementation, devices 120 may be remote from machine 105 (in the sense that devices 120 are not physically within machine 105). Devices 120 might be part of the same local space as machine 105 (for example, in the same server room, or even within the same rack, as machine 105), or devices 120 might be physically (geographically) remote from machine 105. Switch 705 may be any variety of switch: for example, a PCIe switch, a CXL switch, an Ethernet switch, etc. All that is needed is that switch 705 support devices 120 accessing buffers 330 of FIG. 3, which may be in memory 115 of FIG. 1 or SLM 325 of FIG. 3 of other devices.

Note that device 120-1 may also include inter-process communication (IPC) 710-1, and device 120-2 may include IPC 710-2. (IPCs 710-1 and 710-2 may be referred to collectively as IPC 710.) IPCs 710 may manage communication with other devices 120: sending communications other devices 120 using buffers 330 of FIG. 3, writing data into SLM 325 of FIG. 3 of the other devices (so that data is available for processing), and so on.

Figure 8:
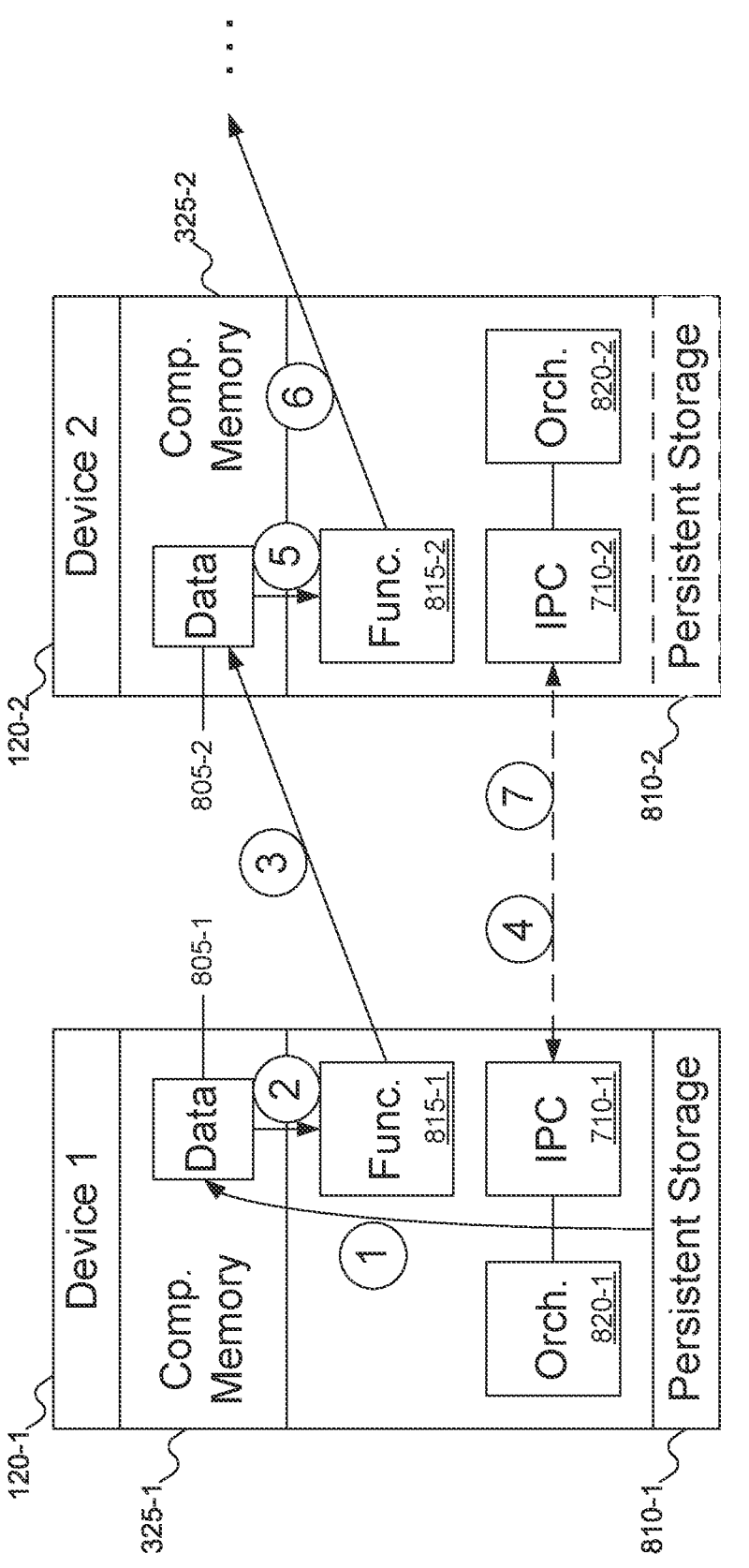
FIG. 8 shows the devices of FIG. 1 communicating to create a processing pipeline, according to embodiments of the disclosure.

FIG. 8 illustrates how IPCs 710 may function (as part of devices 120), specifically in implementing a pipeline for data processing. FIG. 8 shows devices 120 of FIG. 1 communicating to create a processing pipeline, according to embodiments of the disclosure. In FIG. 8, processor 110 of FIG. 1 may issue a request to device 120-1 via an appropriate submission queue to begin processing data. This request from processor 110 of FIG. 1 may include, among other data, the address and size of the data to be processed, the functions to be executed in processing the data in the pipeline, and the address where any result of the processing may be stored (for example, an address in memory 115 of FIG. 1, or an address in some computational memory 325 of some device 120). In some embodiments of the disclosure, processor 110 of FIG. 1 may specify which devices 120 are to perform the various functions to be executed in processing the data in the pipeline; in other embodiments of the disclosure, processor 110 of FIG. 1 may specify only the functions to be executed, and leave it to device 120-1 to determine which other devices 120 may offer the functions needed in executing the functions of the pipeline. In some embodiments of the disclosure, processor 110 of FIG. 1 may allocate space in computational memory 325 of each device 120 in the pipeline where data may be stored (as data traverses the pipeline); in other embodiments of the disclosure, processor 110 of FIG. 1 may leave it to devices 120 to allocate space in computational memory 325 of each device 120 as needed to deliver data along the pipeline.

Once device 120-1 has received the request from processor 110, device 120-1 may load data 805-1 from persistent storage 810-1 into computational memory 325-1 (for example, SLM 325-1) (shown as operation 1). Once data 805-1 has been loaded into computational memory 325-1, device 120-1 may execute function 815-1 on data 805-1 (shown as operation 2). For example, function 815-1 might be to filter data 805-1 according to some criteria, allowing only the data that passes the filter to continue along the pipeline. The result of executing function 815-1 on data 805-1 may be written into computational memory 325-2 of device 120-1 as data 805-2 (shown as operation 3). IPC 710-1 of device 120-1 may then notify IPC 710-2 of device 120-2 to begin executing function 815-2 on data 805-2 (shown as operation 4). This communication may be, for example, message 505 of FIG. 5. Device 120-2 may then execute function 815-2 on data 805-2 (shown as operation 5). For example, function 815-2 might be to encrypt the data according to some encryption protocol. The result of executing function 815-2 on data 805-2 may then be written somewhere else (shown as operation 6): this result may be written, for example, in computational memory 325 of yet another device 120 for further execution of the pipeline, or this result may be written to the location specified by processor 110 of FIG. 1 in its original request to device 120-1.

For the moment, assume that device 120-2 is the last device 120 to process the data in the pipeline, and after writing the data (as shown in operation 6), device 120-2 may send result 515 of FIG. 5 back to device 120-1 (shown as operation 7). At this point, device 120-2 has completed its operations.

Device 120-1, upon receiving result 515 of FIG. 5 from device 120-2, may now know that processing of the request issued by processor 110 of FIG. 1 to device 120-1 is now complete. Device 120-1 may then issue a response to processor 110 of FIG. 1 to inform processor 110 of FIG. 1 that processing is complete and the data is present at the specified location.

Note that device 120-2 is also shown as including persistent storage 810-2. In some embodiments of the disclosure, device 120-2 might be a computational storage unit as part of a storage device: the storage device itself may be represented as persistent storage 810-2. But in other embodiments of the disclosure, device 120-2 might only include processing capability and no persistent storage, which is why persistent storage 810-2 is shown with a dashed line. (In some embodiments of the disclosure, device 120-1 might not include persistent storage 810-1, but might read data 805-1 from some other source.)

While FIG. 8 shows a pipeline of only two devices 120, embodiments of the disclosure may include a pipeline of any desired length. For example, the pipeline could include 50 devices, each performing various tasks. In addition, devices 120 might be used multiple times along the pipeline. For example, one device 120-1 might include two functions 815 that may be used at different points in the pipeline. Device 120-1 might execute the first function and deliver the resulting data to the next device, eventually receive the data that has been further processed, and execute the second function on the data at that point. (Device 120-1 might be used more than twice: device 120-1 including two such functions 815 used in the pipeline is merely an example.) Data may be moved between/among devices 120 as needed to support processing by the functions used in the pipeline.

In some embodiments, the last device 120 in the pipeline may send a response back to processor 110 of FIG. 1 to inform processor 110 of FIG. 1 that processing of the data in the pipeline has completed. But in some embodiments, such a response has to come from the device 120 to which processor 110 of FIG. 1 issued the request. For example, the NVMe protocol specifies that the devices own their completion queues, and a response would need to be sent via the completion queue that is owned by the device 120 that received the request from processor 110 of FIG. 1. In such situations, device 120-1 (which received the original request from processor 110 of FIG. 1) may wait until it receives response 515 of FIG. 5 from device 120-2 before sending the response back to processor 110 of FIG. 1.

But if the pipeline is long, it may take some time for the responses 515 to percolate back through the pipeline for device 120-1 to be able to notify processor 110 of FIG. 1 that processing of the data is complete. To expedite the response sent from device 120-1 to processor 110 of FIG. 1, the last device 120 in the pipeline may send message 505 of FIG. 5 to device 120-1 via the appropriate buffer 330 of FIG. 3, notifying device 120-1 that processing of the data in the pipeline is complete. Device 120-1, upon receiving this message 505 of FIG. 5, may then send a response to processor 110 of FIG. 1 without having to wait for all responses 515 of FIG. 5 to percolate through the pipeline (and in particular to receive response 515 of FIG. 5 from device 120-2). In this manner, device 120-1 may send a response to processor 110 of FIG. 1 via the appropriate completion queue more rapidly.

As each device 120 may be responsible for delivering processed data to the next device 120 in the pipeline, each device 120 may need to know both what function it is to perform and what device 120 (and that device's 120 function

815) will next process the device. Thus, the communication between IPCs 710 may include information about where processing is in the pipeline as well as what processing remains in the pipeline, so that the next device 120 may not only execute its function but also inform the device 120 after it about what function 815 that device is to execute. (Of course, each device 120 may remove from the communication the processing it has performed, so that devices 120 further down the pipeline only see the functions 815 that they or other later devices 120 need to execute, rather than any functions 815 that have already been executed.)

As mentioned above, in some embodiments of the disclosure, each device 120 may be left to allocate space in computational memory 325 of the next device 120. In such embodiments of the disclosure, allocating the space in computational memory 325 of the next device 120 may be performed before function 815 is executed on data 805 (so that there is a place to write the result of executing function 815).

In the example of FIG. 8, each device is shown writing the result of its function 815 in computational memory 325 of the next device 120. In some embodiments of the disclosure, this may be considered advantageous: it is likely faster for one device 120 to access data 805 from its own computational memory 325 than from computational memory 325 of another device 120 (or from memory 115 of FIG. 1). But in other embodiments of the disclosure, data 805 may be stored in any desired location, even if not in computational memory 325 of the device 120 to execute the next function 815 in the pipeline: each device 120 may access the data 805 from wherever it might be stored.

In FIG. 8, it is implied that each function 815 completely processes data 805 and writes the resulting data 805 in an appropriate location before IPC 710 triggers the next device 120 to begin executing its function 815. But in some embodiments of the disclosure, data 805 to be processed might be large: large enough that having each device 120 wait until the previous device 120 has completely processed all of the data 805 before starting its own processing that the that the inherent delay may become significant. Therefore, in some embodiments of the disclosure, each device 120 may stream data 805 to the next device 120 as it is processed, rather than waiting for all data 805 to be processed before triggering the next device 120 to begin executing its function 815. For example, device 120-1 may process a portion (for example, four kilobytes (KB)) of data 805-1, and write the result as data 805-2 in computational memory 325 of device 120-2. IPC 710-1 may then send message 505 of FIG. 5 to device 120-2 to begin processing data 805-2. In the meantime, function 815-1 may continue processing another chunk of data 805-1: once that chunk of data 805-1 is processed, the result of processing that chunk of data 805-1 (that is, another chunk of data 805-2) may be written to computational memory 325 of device 120-2, and IPC 710-1 may send another message 505 of FIG. 5 to device 120-2 to continue processing data 805-2. In such embodiments of the disclosure, messages 505 of FIG. 5 may include a flag indicating whether or not further data 805-2 may be written to computational memory 325 of device 120-2. If this flag is set, then device 120-2 may know that additional data 805-2 may be forthcoming; if this flag is not set, then device 120-2 may know that this is the last of the data 805-2 to be processed. Note that this flag may only need to distinguish between two cases, and therefore may only need to be one bit in size.

One aspect of FIG. 8 that has not been discussed is orchestrators 820-1 and 820-2 (which may be referred to collectively as orchestrators 820). While IPCs 710 may issue communications to other devices 120, orchestrators 820 may identify which device 120 IPC 710 should communicate with. For example, orchestrators 820 may examine what processing remains to be performed in the pipeline and may identify which device 120 may include the next function 815 to be executed on the data 805. Knowing what device 120 may next be used in the pipeline, orchestrators 820 may inform IPCs 710 which device should be communicated with next. Orchestrators 820 may also be responsible for determining which device 120 should receive a response 515 of FIG. 5 from the current device 120 using IPC 710.

In some embodiments of the disclosure, each device 120 may be responsible for determining what function 815 it has to execute and what device 120 is next in the pipeline. But in other embodiments of the disclosure, a single device 120 may be responsible for orchestrating the entire pipeline. For example, upon receiving a request from processor 110 of FIG. 1, device 120-1 may perform its function 815-1 on data 805-1, then send message 505 of FIG. 5 to device 120-2 to execute its function 815-2 on data 805-2 (using orchestrator 820-1 and IPC 710-1). Device 120-2 may then issue response 515 of FIG. 5 to device 120-1, after which device 120-2 may send message 505 of FIG. 5 to the next device 120 to execute its function 815 on data 805 (again, using orchestrator 820-1 and IPC 710-1). This process may repeat as needed until the pipeline is complete, with orchestrator 820-1 managing the notification of each device 120 in turn to perform its portion of the pipeline.

In some embodiments of the disclosure, processor 110 of FIG. 1 may issue separate requests for each operation device 120-1 is expected to perform. For example, rather than a single request instructing device 120-1 to load data 805-1 from persistent storage 810-1 into computational memory 325-1 and to then being processing data 805-1 along the pipeline, processor 110 of FIG. 1 might issue one request for device 120-1 to load data 805-1 from persistent storage 810-1 into computational memory 325, and then issue a separate request to begin processing data 805-1 in the pipeline.

As mentioned above, in some embodiments of the disclosure, processor 110 of FIG. 1 might simply specify what functions 815 are to be executed in the pipeline, but not what devices 120 may execute such functions 815. In such embodiments of the disclosure, orchestrator 820-1 may determine which device 120 may perform the next function 815 in the pipeline (and potentially other functions 815 in the pipeline afterward, so that all devices 120 afterward know what devices 120 will perform what functions 815 in the pipeline). Each device 120 may advertise what functions 815 it offers, so that other devices 120 may know this information. Orchestrator 820-1 may then use this information to select device(s) 120 that include the function(s) needed in the pipeline to orchestrate correctly which devices 120 will perform what functions 815 in executing the pipeline.

Aside from using IPCs 710 for pipeline execution of commands among devices 120, IPC 710 may also be used for other tasks. These other tasks may include write leveling, distributed garbage collection, memory sharing, computational sharing, discovery, data migration, and autonomous analytics, among other possibilities.

Write leveling may occur when a drive is currently busy, or otherwise would be delayed in completing a write request. For example, consider the situation where processor 110 of FIG. 1 asks device 120-1 to write some data. If device 120-1 is currently involved in a lengthy task (for example, reading 100 gigabytes (GB) of data), performing the write request as specified might be significantly delayed until the read request is complete. To avoid delaying the write request, device 120-1 might use IPC 710-1 to send message 505 to device 120-2, forwarding the write request to device 120-2 and specifying the address in memory 115 of FIG. 1 as specified by processor 110 of FIG. 1 in the original write request. Device 120-2 may the use a Direct Memory Access (DMA) transfer to copy the data from memory 115 of FIG. 1 into persistent storage 810-2. Device 120-2 might then send response 515 of FIG. 5 back to device 120-1, and device 120-1 might then respond to the original write request, but notifying processor 110 of FIG. 1 that device 120-2 actually stores the data (since processor 110 of FIG. 1 would expect device 120-1 to store the data as the recipient of the original write request).

If data is moved from one device 120 to another device 120, either as part of wear-leveling or for any other reason as discussed below, devices 120 may issue Asynchronous Event Notifications (AENs) to processor 110 of FIG. 1 to notify processor 110 of FIG. 1 where the data is now resident.

In some situations, there might be some sort of conflict on device 120-2 to storing the data. This conflict might include a conflicting Logical Block Address (LBA) (device 120-2 might already store data associated with the LBA specified in the write request), a namespace conflict (device 120-2 might already store data associated with the namespace specified in the write request), an endurance group conflict (device 120-2 might not have an endurance group as specified in the write request), or other conflicts. Such conflicts may be resolved in any desired manner, with device 120-2 reporting to device 120-1 how the conflict was resolved, so that device 120-1 may notify processor 110-1 about the conflict and its resolution. For example, in the case of an LBA conflict, device 120-2 might select another LBA that has no conflict for device 120-2 and inform device 120-1 that that new LBA was used instead.

In some embodiments of the disclosure, devices 120 may share analytics (as discussed below), which may include their average wear (that is, how many program/erase cycles each cell in device 120 has on average). Device 120-1 may then use this information to select device 120-2 that optimizes the overall wear of devices 120.

In some embodiments of the disclosure, devices 120 may share analytics (as discussed below), which may include the ratio of hot/cold data on each device 120. The ratio of hot/cold data may reflect how much data currently on any individual device is hot data (data that is accessed or updated relatively frequently) or cold data (data that is accessed or updated relatively infrequently). The devices 120 may attempt to balance their relative hot/cold ratios to ensure that device loads are balanced. For example, if one device 120 has mostly hot data and another device 120 has mostly cold data, then it may be expected that the device 120 with mostly hot data will be relatively busy, while the device 120 with mostly cold data will be relatively idle. Balancing their respective proportions of hot and cold data may result in both devices 120 relatively equally busy, rather than one device 120 potentially idle and the other device 120 potentially overloaded.

Inter-device communication may also be used to coordinate garbage collection across devices. For example, one device 120 may let other devices 120 know that the device 120 is beginning garbage collection, and that other devices 120 should not begin garbage collection at this time (to maximize the availability of devices 120). In addition, as part of performing garbage collection, one device 120 might perform wear-leveling of its data, potentially distributing some of that data to other devices 120. In such a situation, the other devices 120 may need to be available to receive write requests from the device 120 performing garbage collection, which the other devices 120 might not be able to do if they begin garbage collection themselves. Alternatively, the hot/cold ratio of data on the device performing garbage collection may be considered out of balance, and may be rebalanced as part of garbage collection.

Inter-device communication may also be used for memory sharing. Memory may be abstracted: it is possible for a device 120 to write data to an address without knowing what device 120 hosts that address. Ideally, the address may be somewhere where the data will next be used (for example, in another device 120 if the data is moving through a pipeline of processing, or memory 115 of FIG. 1 for data to be accessed by processor 110 of FIG. 1). But there may be situations where the ideal location to store the data may not be able to store the data. For example, if the next device 120 in a pipeline does not have enough space in SLM 325 of FIG. 3, then the data may need to be stored somewhere else (for example, another device 120). The device 120 attempting to store the data may allocate memory somewhere else, write the data to the newly allocated memory, and inform the next device 120 in the pipeline where the data is actually stored so that the next device 120 in the pipeline may read the data from that address.

Inter-device communication may also be used for discovery purposes. A device 120 may send communications to other devices 120 to let them know the capabilities of the device 120. For example, a device 120 might advertise what computational functions the device 120 offers, or its storage capacity or its amount of free space, or its available local memory. Other devices 120, particularly ones that are busy, may then use this information to pass messages or requests to a device 120 that is less busy.

Inter-device communication may also be used for compute sharing. As discussed above, devices 120 may advertise their capabilities: for example, the computational functions they offer. A device 120 that is currently busy may identify another device 120 that may offer that a particular computational function and may redirect a request to use that computational function to the other device 120.

Inter-device communication may also be used for data migration. For example, consider the situation where a die in a device 120 begins to fail. It may still be possible to read data off of the die (using error correction techniques to correct for errors that may reflect the die beginning to fail). Data on that die may be migrated to another device 120, so that the data is not lost. (It might also be beneficial to transfer data from other dies on that device 120 as well, as the failure of one die might be indicative that the entire device 120 is likely to fail soon.) Processor 110 of FIG. 1 may be notified about the data migration using an AEN.

Inter-device communications may also be used for autonomous analytics. Devices 120 may share information about their states, so that data and/or processing functions may be shifted between or among devices 120 to best optimize operations.

FIG. 9 shows a flowchart of an example procedure for devices 120 of FIG. 1 to communicate using buffers 330 of FIG. 3, according to embodiments of the disclosure. In FIG. 9, at block 905, one device 120 of FIG. 1 may identify a second device 120 of FIG. 1 to which a communication is to be sent. At block 910, the first device 120 of FIG. 1 may establish entry 405 of FIG. 4. Entry 405 of FIG. 4 may include the communication to be send from the first device 120 of FIG. 1 to the second device 120 of FIG. 1. Finally, at block 915, the first device 120 of FIG. 1 may place entry 405 of FIG. 4 in buffer 330 of FIG. 3 for later retrieval by the second device 120 of FIG. 1.

FIG. 10 continues the flowchart of the example procedure of FIG. 9 for devices 120 of FIG. 1 to communicate using buffers 330 of FIG. 3, according to embodiments of the disclosure. In FIG. 10, at block 1005, at some point after block 915 of FIG. 9, the second device 120 of FIG. 1 may retrieve entry 405 of FIG. 4 from buffer 330 of FIG. 3. At block 1010, the second device 120 of FIG. 1 may then process the communication from entry 405 of FIG. 4.

FIG. 11 shows a flowchart of an example procedure for device 120 of FIG. 1 to place entry 405 of FIG. 4 in buffer 330 of FIG. 3, according to embodiments of the disclosure. In FIG. 11, at block 1105, first device 120 of FIG. 1 may place entry 405 of FIG. 4 in buffer 330 of FIG. 3 at a location pointed to by tail pointer 415 of FIG. 4. At block 1110, first device 120 of FIG. 1 may update tail pointer 415 of FIG. 4 to point to the next location in buffer 330 of FIG. 3 (to store the next entry 405 of FIG. 4).

FIG. 12 shows a flowchart of an example procedure for device 120 of FIG. 1 to retrieve entry 405 of FIG. 4 from buffer 330 of FIG. 3, according to embodiments of the disclosure. In FIG. 12, at block 1205, second device 120 of FIG. 1 may retrieve entry 405 of FIG. 4 from a location pointed to by head pointer 410 of FIG. 4. At block 1210, second device 120 of FIG. 1 may update head pointer 410 of FIG. 4 to point to the next location in buffer 330 of FIG. 3 (to retrieve the next entry 405 of FIG. 4).

Figures 13, 14:
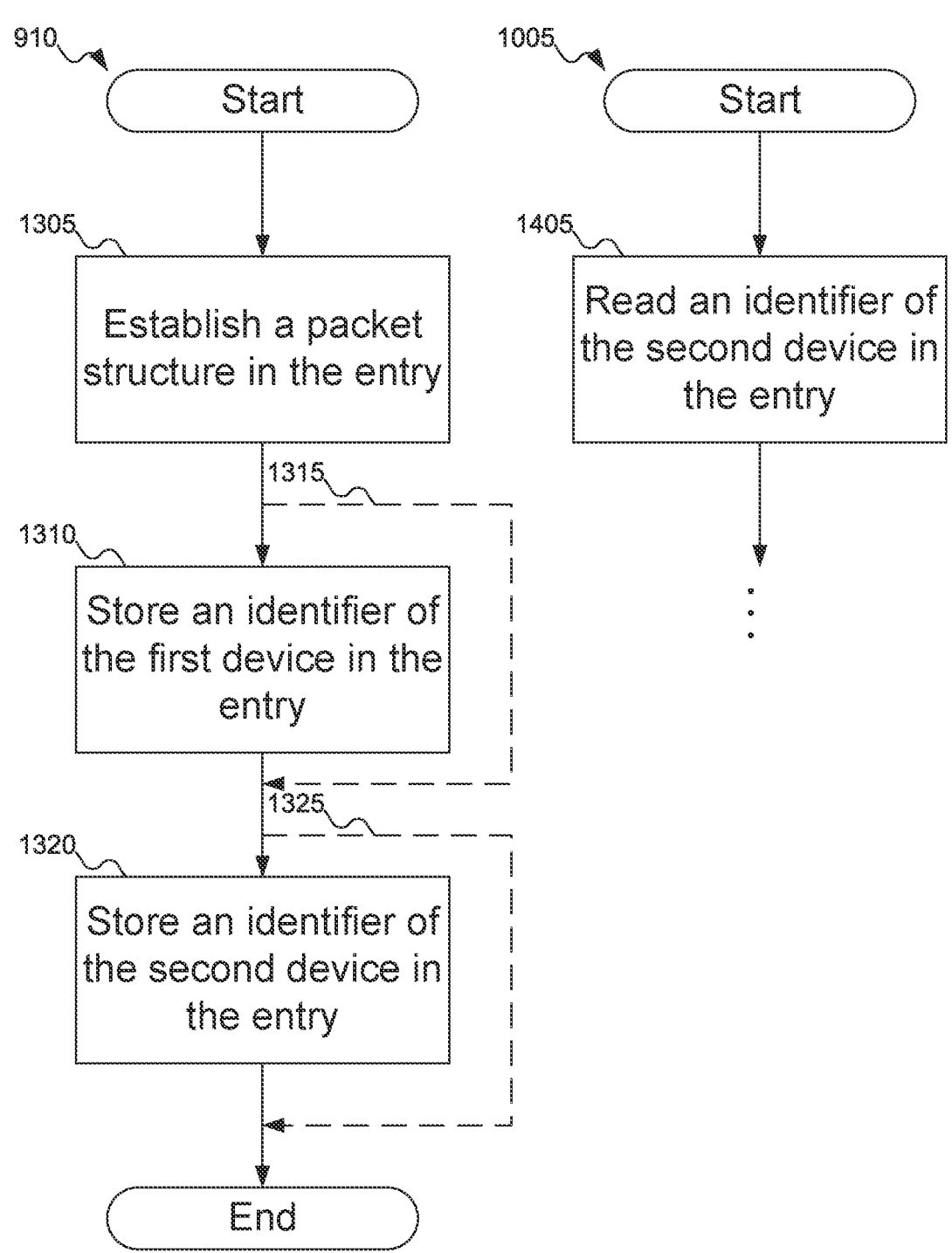
FIG. 13 shows a flowchart of an example procedure for the device of FIG. 1 to create an entry to be placed in the buffer of FIG. 3, according to embodiments of the disclosure.
FIG. 14 shows a flowchart of an example procedure for the device of FIG. 1 to identify an entry in the buffer of FIG. 3 for which the device of FIG. 3 is the intended recipient, according to embodiments of the disclosure.

FIG. 13 shows a flowchart of an example procedure for device 120 of FIG. 1 to create entry 405 of FIG. 4 to be placed in buffer 330 of FIG. 3, according to embodiments of the disclosure. In FIG. 13, at block 1305, first device 120 of FIG. 1 may establish a packet structure, such as SQE 510 or CQE 520 of FIG. 5, in entry 405 of FIG. 4. At block 1310, first device 120 of FIG. 1 may store an identifier of first device 120 of FIG. 1 in entry 405 of FIG. 4. This identifier may be used, for example, if multiple devices 120 of FIG. 1 may place entries 405 of FIG. 4 in buffer 330 of FIG. 3. Block 1310 may be omitted, as shown by dashed line 1315. At block 1320, first device 120 of FIG. 1 may store an identifier of second device 120 of FIG. 1 in entry 405 of FIG. 4. This identifier may be used, for example, if multiple devices 120 of FIG. 1 may retrieve entries 405 of FIG. 4 from buffer 330 of FIG. 3. Block 1320 may be omitted, as shown by dashed line 1325.

FIG. 14 shows a flowchart of an example procedure for device 120 of FIG. 1 to identify entry 405 of FIG. 4 in buffer 330 of FIG. 3 for which device 120 of FIG. 3 is the intended recipient, according to embodiments of the disclosure. In FIG. 14, at block 1405, second device 120 of FIG. 1 may examine entry 405 of FIG. 4 to determine if entry 405 of FIG. 4 includes an identifier of second device 120 of FIG. 1. The inclusion of this identifier of second device 120 of FIG. 1 may indicate that entry 405 of FIG. 4 is intended for second device 120 of FIG. 1 (rather than for some other device 120 of FIG. 1 that might also retrieve entries 405 of FIG. 4 from buffer 330 of FIG. 3).

FIG. 15 shows a flowchart of an example procedure for device 120 of FIG. 1 to place entry 405 of FIG. 4 in buffer 330 of FIG. 3 that may be read or written by more than one device 120 of FIG. 1, according to embodiments of the disclosure. In FIG. 15, at block 1505, device 120 of FIG. 1 may obtain a lock on buffer 330 of FIG. 3. At block 1510, device 120 of FIG. 1 may access (that is, read or write, as appropriate) entry 405 of FIG. 4 from buffer 330 of FIG. 3. Finally, at block 1515, device 120 of FIG. 1 may release the lock on buffer 330 of FIG. 3, so that another device 120 of FIG. 1 may access buffer 330 of FIG. 3.

FIG. 16 shows a flowchart of an example procedure for processor 110 of FIG. 1 or devices 120 of FIG. 1 to establish buffers 330 of FIG. 3, according to embodiments of the disclosure. In FIG. 16, at block 1605, devices 120 of FIG. 1 are identified. At block 1610, buffers 330 of FIG. 3 may be established. Finally, at block 1320 of FIG. 13, devices 120 of FIG. 1 may be notified about buffers 330 of FIG. 3 that are relevant to devices 330 of FIG. 3.

In FIGS. 9-16, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Some embodiments of the disclosure may include a buffer accessible to devices. One or more devices may write to the buffer, and one or more devices may read from the buffer. Including the buffer provides a technical advantage in that devices may communicate with each other without having to use the host processor as an intermediary.

Embodiments of the disclosure include a method to permit drives, such as storage devices and more particularly Non-Volatile Memory Express (NVMe) storage devices, to send commands/responses to one another. The host, which has information about all the drives in the system, may configure ring buffers in device Peripheral Component Interconnect Express (PCIe), such as a controller memory buffer (CMB), a persistent memory region (PMR), or other memory accessible exposed through a base address register (BAR), or other memory accessible by the drives. The ring buffers may be accessible using PCIe, a cache-coherent interconnect protocol such as the Compute Express Link® (CXL®) protocol, Remote Direct Memory Access (RDMA), or NVLink®. (Compute Express Link and CXL are registered trademarks of Compute Express Link Consortium, Inc.; NVLink is a registered trademark of NVIDIA Corporation.) The host may notify each drive of the memory to use for individual ring buffers, and may notify peer drives of the addresses where messages may be written to send to the other drive. The ring buffer may use a data structure, such as a First In, First Out (FIFO) queue, a circular queue, head/tail pointers, and/or a buffer.

The peer drives may be identified using their NVMe Qualified Name (NQN).

For each pair of drives, there may be two ring buffers: one for each drive to write to. In this manner, write conflicts may be avoided: each drive may write to a separate ring buffer (and each drive may read from the ring buffer written to by the other drive. So, for a system including n drives, the total number of ring buffers may be $$2 \times \binom{n}{2}:$$

that is, there are $$\binom{n}{2} = \Sigma_{i=1}^{(n-1)} i = \frac{n(n-1)}{2}$$

pairs of drives, with two ring buffers per pair of drives. Each drive may read from the head of its ring buffer, and may write to the tail of the ring buffer of its peer. If the head and tail pointers of any ring buffer are the same, then the ring buffer is empty; if the tail pointer identifies the entry of the ring buffer after the head pointer (mathematically, if (Head+1)% Max=Tail), then the ring buffer is full. To avoid critical sections, the sender (the drive writing to the ring buffer) may own the head pointer, and the receiver (the drive reading from the ring buffer) may own the tail pointer. This structure may support communication using messages similar to submission queue entries/completion queue entries packets.

Embodiments of the disclosure may include a protocol for drive configuration and/or reset/shutdown.

In one embodiment of the disclosure, computational storage drives (CSD) may cooperatively perform portions of a processing task. The first CSD may process data and write the results into the PCIe-accessible memory of the second CSD. Once the writing is complete, the first CSD may use inter-drive communication to message the second CSD that data is present in its memory and the second CSD may being processing the data. Once the second CSD completes processing of the data, the second CSD may send a message to the first CSD to complete the computational program and notify the host of the data availability (in the second CSD's memory space).

Inter-drive communication may also be used for other purposes, such as:

Write-Leveling: A write may be blocked for the drive selected by the host, and may be redirected to another drive (using inter-drive-communication path) with the completion identifying that another drive completed the command. Similarly, if drives communicate their wear-delta, writes may be redirected to less worn drives.

Distributed Garbage Collection: Drives may communicate to adopt a distributed garbage collection strategy.

Memory Sharing: Drives may transiently share their PCIe-accessible memory using inter-drive messages to allocate and deallocate space.

Compute Sharing: Drives may utilize features in other drives using inter-drive messages to request data processing.

Discovery: Drives may advertise their capabilities (memory and/or features) to peer drives for their use (enabling Memory and Compute sharing).

Data Migration: Drives may migrate data to other drives (for performance or protection) with a subsequent host notification.

Autonomous Analytics: Drives may share their monitoring data for predictive analytics and failure prediction. This data may also be utilized for write-leveling (autonomous data balancing).

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a system, comprising:

a first device;

a second device;

a processor to communicate with the first device and the second device; and a buffer to store an entry including a communication from the first device to the second device.

Statement 2. An embodiment of the disclosure includes the system according to statement 1, wherein the first device includes:

a first interface for communicating with the second device; and a second interface for communicating with the processor.

Statement 3. An embodiment of the disclosure includes the system according to statement 1, wherein the system includes:

a first communication path between the first storage device and the second device; and a second communication path between the first storage device and the processor.

Statement 4. An embodiment of the disclosure includes the system according to statement 1, wherein the first device includes a storage device or a computational storage unit.

Statement 5. An embodiment of the disclosure includes the system according to statement 1, wherein the second device includes a storage device or a computational storage unit.

Statement 6. An embodiment of the disclosure includes the system according to statement 1, wherein the buffer includes a ring buffer.

Statement 7. An embodiment of the disclosure includes the system according to statement 6, wherein the ring buffer includes:

a head pointer; and a tail pointer.

Statement 8. An embodiment of the disclosure includes the system according to statement 7, wherein:

the first device is configured to write an entry into the ring buffer based at least in part on the tail pointer; and the second device is configured to read the entry from the ring buffer based at least in part on the head pointer.

Statement 9. An embodiment of the disclosure includes the system according to statement 1, wherein the buffer is further configured to store a second entry including a second communication from the second device to the first device.

Statement 10. An embodiment of the disclosure includes the system according to statement 9, wherein:

the entry includes a first identifier of the first device; and the second entry includes a second identifier of the second device.

Statement 11. An embodiment of the disclosure includes the system according to statement 9, wherein the buffer includes a lock mechanism to prevent the first device writing the entry and the second device writing the second entry to the buffer at the same time.

Statement 12. An embodiment of the disclosure includes the system according to statement 1, further comprising a memory coupled to the processor, the memory of the system including the buffer.

Statement 13. An embodiment of the disclosure includes the system according to statement 1, wherein the first device includes a memory, the memory of the first device including the buffer.

Statement 14. An embodiment of the disclosure includes the system according to statement 1, wherein the second device includes a memory, the memory of the second device including the buffer.

Statement 15. An embodiment of the disclosure includes the system according to statement 1, further comprising a third device.

Statement 16. An embodiment of the disclosure includes the system according to statement 15, wherein the third device includes a memory, the memory of the third device including the buffer.

Statement 17. An embodiment of the disclosure includes the system according to statement 16, wherein the buffer is configured to store a second entry including a second communication from the third device to the second device.

Statement 18. An embodiment of the disclosure includes the system according to statement 17, wherein:

the entry includes a first identifier of the first device; and the second entry includes a second identifier of the third device.

Statement 19. An embodiment of the disclosure includes the system according to statement 17, wherein the buffer includes a lock mechanism to prevent the first device writing the entry and the third device writing the second entry to the buffer at the same time.

Statement 20. An embodiment of the disclosure includes the system according to statement 1, further comprising a second buffer to store a second entry including a second communication from the second device to the first device.

Statement 21. An embodiment of the disclosure includes the system according to statement 20, wherein the second buffer includes a ring buffer.

Statement 22. An embodiment of the disclosure includes the system according to statement 21, wherein the ring buffer includes:

a head pointer; and a tail pointer.

Statement 23. An embodiment of the disclosure includes the system according to statement 22, wherein:

the second device is configured to write an entry into the ring buffer based at least in part on the tail pointer; and the first device is configured to read the entry from the ring buffer based at least in part on the head pointer.

Statement 24. An embodiment of the disclosure includes the system according to statement 20, further comprising a memory coupled to the processor, the memory of the system including the second buffer.

Statement 25. An embodiment of the disclosure includes the system according to statement 20, wherein the first device includes a memory, the memory of the first device including the second buffer.

Statement 26. An embodiment of the disclosure includes the system according to statement 20, wherein the second device includes a memory, the memory of the second device including the second buffer.

Statement 27. An embodiment of the disclosure includes the system according to statement 20, further comprising a third device, the third device including a memory, the memory of the third device including the second buffer.

Statement 28. An embodiment of the disclosure includes the system according to statement 1, wherein the entry includes a packet structure.

Statement 29. An embodiment of the disclosure includes the system according to statement 28, wherein the packet structure includes a submission packet structure or a completion packet structure.

Statement 30. An embodiment of the disclosure includes the system according to statement 1, wherein the processor is configured to establish the buffer in a memory based at least in part on the processor identifying the first device and the second device.

Statement 31. An embodiment of the disclosure includes the system according to statement 30, wherein the processor is further configured to send a notification to the first device and the second device about the buffer in the memory of the system.

Statement 32. An embodiment of the disclosure includes the system according to statement 1, wherein the first device is configured to establish the buffer.

Statement 33. An embodiment of the disclosure includes the system according to statement 32, wherein the first device is configured to establish the buffer based at least in part on the first device receiving a notification about the second device.

Statement 34. An embodiment of the disclosure includes the system according to statement 33, wherein the first device is configured to establish the buffer based at least in part on the processor sending the notification to the first device about the second device based at least in part on the processor identifying the second device.

Statement 35. An embodiment of the disclosure includes the system according to statement 33, wherein the first device is configured to establish the buffer based at least in part on the first device receiving the notification from the second device.

Statement 36. An embodiment of the disclosure includes the system according to statement 32, wherein the first device is further configured to send a notification to the second device about the buffer.

Statement 37. An embodiment of the disclosure includes the system according to statement 1, wherein the second device is configured to establish the buffer.

Statement 38. An embodiment of the disclosure includes the system according to statement 37, wherein the second device is configured to establish the buffer based at least in part on the second device receiving a notification about the first device.

Statement 39. An embodiment of the disclosure includes the system according to statement 38, wherein the second device is configured to establish the buffer based at least in part on the processor sending the notification to the second device about the first device based at least in part on the processor identifying the first device.

Statement 40. An embodiment of the disclosure includes the system according to statement 38, wherein the second device is configured to establish the buffer based at least in part on the second device receiving the notification from the first device.

Statement 41. An embodiment of the disclosure includes the system according to statement 37, wherein the second device is further configured to send a notification to the first device about the buffer.

Statement 42. An embodiment of the disclosure includes the system according to statement 1, wherein:

the system further comprises a third device; and the third device is configured to establish the buffer.

Statement 43. An embodiment of the disclosure includes the system according to statement 42, wherein the third device is configured to establish the buffer based at least in part on the third device receiving a notification about the first device and the second device.

Statement 44. An embodiment of the disclosure includes the system according to statement 43, wherein the notification includes a first notification about the first device and a second notification about the second device.

Statement 45. An embodiment of the disclosure includes the system according to statement 43, wherein the third device is configured to establish the buffer based at least in part on the processor sending the notification to the third device about the first device and the second device based at least in part on the processor identifying the first device and the second device.

Statement 46. An embodiment of the disclosure includes the system according to statement 43, wherein the third device is configured to establish the buffer based at least in part on the third device receiving the notification from the first device and the second device.

Statement 47. An embodiment of the disclosure includes the system according to statement 42, wherein the third device is further configured to send a notification to the first device and the second device about the buffer.

Statement 48. An embodiment of the disclosure includes the system according to statement 1, wherein the communication includes advertising a capability of the first device, analytics of the first device, redirection of a write request received at the first device from the processor, garbage collection coordination, execution of a computational function of the second device, or data migration from the first device.

Statement 49. An embodiment of the disclosure includes a method, comprising:

identifying, at a first device, a second device to which a communication is to be directed;

establishing an entry by the first device, the entry including the communication; and placing the entry in a buffer by the first device for delivery to the second device, wherein the second device retrieves the entry from the buffer.

Statement 50. An embodiment of the disclosure includes the method according to statement 49, wherein the first device includes:

a first interface for communicating with the second device; and a second interface for communicating with the processor.

Statement 51. An embodiment of the disclosure includes the method according to statement 49, wherein:

a first communication path enables communication between the first storage device and the second device; and a second communication path enables communication between the first storage device and the processor.

Statement 52. An embodiment of the disclosure includes the method according to statement 49, wherein the first device includes a storage device or a computational storage unit.

Statement 53. An embodiment of the disclosure includes the method according to statement 49, wherein the second device includes a storage device or a computational storage unit.

Statement 54. An embodiment of the disclosure includes the method according to statement 49, wherein the first device and the second device are in communication with a processor.

Statement 55. An embodiment of the disclosure includes the method according to statement 49, wherein the buffer includes a ring buffer.

Statement 56. An embodiment of the disclosure includes the method according to statement 55, wherein the ring buffer includes:

a head pointer; and a tail pointer.

Statement 57. An embodiment of the disclosure includes the method according to statement 56, wherein placing the entry in the buffer by the first device for delivery to the second device includes:

placing the entry in the buffer by the first device at a location identified by the tail pointer; and updating the tail pointer.

Statement 58. An embodiment of the disclosure includes the method according to statement 56, further comprising:

retrieving the entry from the buffer by the second device based at a second location identified by the head pointer; and updating the head pointer.

Statement 59. An embodiment of the disclosure includes the method according to statement 49, further comprising retrieving a second entry from the buffer by the first device, the second entry including a second communication from the second device to the first device.

Statement 60. An embodiment of the disclosure includes the method according to statement 59, wherein:

establishing the entry by the first device includes storing a first identifier of the first device in the entry; and retrieving the second entry from the buffer by the first device includes reading a second identifier of the second device from the second entry.

Statement 61. An embodiment of the disclosure includes the method according to statement 59, wherein placing the entry in the buffer by the first device for delivery to the second device includes:

locking the buffer for the first device; and unlocking the buffer for the first device.

Statement 62. An embodiment of the disclosure includes the method according to statement 49, wherein placing the entry in the buffer by the first device for delivery to the second device includes placing the entry in the buffer of a memory coupled to a processor by the first device for delivery to the second device.

Statement 63. An embodiment of the disclosure includes the method according to statement 49, wherein placing the entry in the buffer by the first device for delivery to the second device includes placing the entry in the buffer of a memory of the first device by the first device for delivery to the second device.

Statement 64. An embodiment of the disclosure includes the method according to statement 49, wherein placing the entry in the buffer by the first device for delivery to the second device includes placing the entry in the buffer of a memory of the second device by the first device for delivery to the second device.

Statement 65. An embodiment of the disclosure includes the method according to statement 49, wherein placing the entry in the buffer by the first device for delivery to the second device includes placing the entry in the buffer of a memory of a third device by the first device for delivery to the second device.

Statement 66. An embodiment of the disclosure includes the method according to statement 49, further comprising retrieving a response from the second device by the first device.

Statement 67. An embodiment of the disclosure includes the method according to statement 66, wherein retrieving the response from the second device by the first device includes retrieving the response from the second device by the first device from a second entry in a second buffer.

Statement 68. An embodiment of the disclosure includes the method according to statement 67, wherein retrieving the response from the second device by the first device from the second entry in the second buffer includes retrieving the response from the second device by the first device from the second entry in the second buffer of a memory coupled to a processor.

Statement 69. An embodiment of the disclosure includes the method according to statement 67, wherein retrieving the response from the second device by the first device from the second entry in the second buffer includes retrieving the response from the second device by the first device from the second entry in the second buffer of a memory of the first device.

Statement 70. An embodiment of the disclosure includes the method according to statement 67, wherein retrieving the response from the second device by the first device from the second entry in the second buffer includes retrieving the response from the second device by the first device from the second entry in the second buffer of a memory of the second device.

Statement 71. An embodiment of the disclosure includes the method according to statement 67, wherein retrieving the response from the second device by the first device from the second entry in the second buffer includes retrieving the response from the second device by the first device from the second entry in the second buffer of a memory of a third device.

Statement 72. An embodiment of the disclosure includes the method according to statement 66, wherein retrieving the response from the second device by the first device includes retrieving the response from the second device by the first device from a second entry in the buffer.

Statement 73. An embodiment of the disclosure includes the method according to statement 49, wherein establishing the entry by the first device includes establishing a packet structure by the first device.

Statement 74. An embodiment of the disclosure includes the method according to statement 73, wherein the packet structure includes a submission packet structure or a completion packet structure.

Statement 75. An embodiment of the disclosure includes the method according to statement 49, further comprising establishing the buffer.

Statement 76. An embodiment of the disclosure includes the method according to statement 75, wherein establishing the buffer includes establishing the buffer in a memory coupled to a processor.

Statement 77. An embodiment of the disclosure includes the method according to statement 75, wherein establishing the buffer includes establishing the buffer in a memory of the first device.

Statement 78. An embodiment of the disclosure includes the method according to statement 75, wherein establishing the buffer includes establishing the buffer in a memory of the second device.

Statement 79. An embodiment of the disclosure includes the method according to statement 75, wherein establishing the buffer includes establishing the buffer in a memory of a third device.

Statement 80. An embodiment of the disclosure includes the method according to statement 75, wherein establishing the buffer includes establishing the buffer by a processor in communication with the first device and the second device.

Statement 81. An embodiment of the disclosure includes the method according to statement 80, wherein establishing the buffer by the processor in communication with the first device and the second device includes:

identifying the first device by the processor;

identifying the second device by the processor; and establishing the buffer by the processor in communication with the first device and the second device includes establishing the buffer by the processor in communication with the first device and the second device based on the processor identifying the first device and the second device.

Statement 82. An embodiment of the disclosure includes the method according to statement 80, wherein establishing the buffer by the processor in communication with the first device and the second device includes:

notifying the first device about the buffer by the processor; and notifying the second device about the buffer by the processor.

Statement 83. An embodiment of the disclosure includes the method according to statement 75, wherein establishing the buffer includes establishing the buffer by the first device.

Statement 84. An embodiment of the disclosure includes the method according to statement 83, wherein establishing the buffer by the first device includes:

identifying the second device by the first device; and establishing the buffer by the first device includes establishing the buffer by the first device based on the first device identifying the second device.

Statement 85. An embodiment of the disclosure includes the method according to statement 84, wherein identifying the second device by the first device includes receiving a notification from a processor in communication with the first device and the second device by the first device about the second device.

Statement 86. An embodiment of the disclosure includes the method according to statement 84, wherein identifying the second device by the first device includes receiving a notification from the second device by the first device about the second device.

Statement 87. An embodiment of the disclosure includes the method according to statement 83, wherein establishing the buffer by the first device includes notifying the second device about the buffer by the first device.

Statement 88. An embodiment of the disclosure includes the method according to statement 75, wherein establishing the buffer includes establishing the buffer by the second device.

Statement 89. An embodiment of the disclosure includes the method according to statement 88, wherein establishing the buffer by the second device includes:

identifying the first device by the second device; and establishing the buffer by the second device includes establishing the buffer by the second device based on the second device identifying the first device.

Statement 90. An embodiment of the disclosure includes the method according to statement 89, wherein identifying the first device by the second device includes receiving a notification from a processor in communication with the first device and the second device by the second device about the first device.

Statement 91. An embodiment of the disclosure includes the method according to statement 89, wherein identifying the first device by the second device includes receiving a notification from the first device by the second device about the first device.

Statement 92. An embodiment of the disclosure includes the method according to statement 88, wherein establishing the buffer by the second device includes notifying the first device about the buffer by the second device.

Statement 93. An embodiment of the disclosure includes the method according to statement 75, wherein establishing the buffer includes establishing the buffer by a third device.

Statement 94. An embodiment of the disclosure includes the method according to statement 93, wherein establishing the buffer by the third device includes:

identifying the first device by the third device;

identifying the second device by the third device; and establishing the buffer by the third device includes establishing the buffer by the third device based on the third device identifying the first device and the second device.

Statement 95. An embodiment of the disclosure includes the method according to statement 94, wherein:

identifying the first device by the third device includes receiving a first notification from a processor in communication with the first device, the second device, and the third device by the third device about the first device; and identifying the second device by the third device includes receiving a second notification from the processor in communication with the first device, the second device, and the third device by the third device about the second device.

Statement 96. An embodiment of the disclosure includes the method according to statement 94, wherein:

identifying the first device by the third device includes receiving a first notification from the first device by the third device about the first device; and identifying the second device by the third device includes receiving a second notification from the second device by the third device about the second device.

Statement 97. An embodiment of the disclosure includes the method according to statement 93, wherein establishing the buffer by the third device includes notifying the first device and the second device about the buffer by the third device.

Statement 98. An embodiment of the disclosure includes the method according to statement 49, wherein the communication includes advertising a capability of the first device, analytics of the first device, redirection of a write request received at the first device from a processor, garbage collection coordination, execution of a computational function of the second device, or data migration from the first device.

Statement 99. An embodiment of the disclosure includes an article, comprising a non-transitory storage medium, the non-transitory storage medium having stored thereon instructions that, when executed by a machine, result in:

identifying, at a first device, a second device to which a communication is to be directed;

establishing an entry by the first device, the entry including the communication; and placing the entry in a buffer by the first device for delivery to the second device, wherein the second device retrieves the entry from the buffer.

Statement 100. An embodiment of the disclosure includes the article according to statement 99, wherein the first device includes:

a first interface for communicating with the second device; and a second interface for communicating with the processor.

Statement 101. An embodiment of the disclosure includes the article according to statement 99, wherein:

a first communication path enables communication between the first storage device and the second device; and a second communication path enables communication between the first storage device and the processor.

Statement 102. An embodiment of the disclosure includes the article according to statement 99, wherein the first device includes a storage device or a computational storage unit.

Statement 103. An embodiment of the disclosure includes the article according to statement 99, wherein the second device includes a storage device or a computational storage unit.

Statement 104. An embodiment of the disclosure includes the article according to statement 99, wherein the first device and the second device are in communication with a processor.

Statement 105. An embodiment of the disclosure includes the article according to statement 99, wherein the buffer includes a ring buffer.

Statement 106. An embodiment of the disclosure includes the article according to statement 105, wherein the ring buffer includes:

a head pointer; and a tail pointer.

Statement 107. An embodiment of the disclosure includes the article according to statement 106, wherein placing the entry in the buffer by the first device for delivery to the second device includes:

placing the entry in the buffer by the first device at a location identified by the tail pointer; and updating the tail pointer.

Statement 108. An embodiment of the disclosure includes the article according to statement 106, the non-transitory storage medium having stored thereon further instructions that, when executed by the machine, result in:

retrieving the entry from the buffer by the second device based at a second location identified by the head pointer; and updating the head pointer.

Statement 109. An embodiment of the disclosure includes the article according to statement 99, the non-transitory storage medium having stored thereon further instructions that, when executed by the machine, result in retrieving a second entry from the buffer by the first device, the second entry including a second communication from the second device to the first device.

Statement 110. An embodiment of the disclosure includes the article according to statement 109, wherein:

establishing the entry by the first device includes storing a first identifier of the first device in the entry; and retrieving the second entry from the buffer by the first device includes reading a second identifier of the second device from the second entry.

Statement 111. An embodiment of the disclosure includes the article according to statement 109, wherein placing the entry in the buffer by the first device for delivery to the second device includes:

locking the buffer for the first device; and unlocking the buffer for the first device.

Statement 112. An embodiment of the disclosure includes the article according to statement 99, wherein placing the entry in the buffer by the first device for delivery to the second device includes placing the entry in the buffer of a memory coupled to a processor by the first device for delivery to the second device.

Statement 113. An embodiment of the disclosure includes the article according to statement 99, wherein placing the entry in the buffer by the first device for delivery to the second device includes placing the entry in the buffer of a memory of the first device by the first device for delivery to the second device.

Statement 114. An embodiment of the disclosure includes the article according to statement 99, wherein placing the entry in the buffer by the first device for delivery to the second device includes placing the entry in the buffer of a memory of the second device by the first device for delivery to the second device.

Statement 115. An embodiment of the disclosure includes the article according to statement 99, wherein placing the entry in the buffer by the first device for delivery to the second device includes placing the entry in the buffer of a memory of a third device by the first device for delivery to the second device.

Statement 116. An embodiment of the disclosure includes the article according to statement 99, the non-transitory storage medium having stored thereon further instructions that, when executed by the machine, result in retrieving a response from the second device by the first device.

Statement 117. An embodiment of the disclosure includes the article according to statement 116, wherein retrieving the response from the second device by the first device includes retrieving the response from the second device by the first device from a second entry in a second buffer.

Statement 118. An embodiment of the disclosure includes the article according to statement 117, wherein retrieving the response from the second device by the first device from the second entry in the second buffer includes retrieving the response from the second device by the first device from the second entry in the second buffer of a memory coupled to a processor.

Statement 119. An embodiment of the disclosure includes the article according to statement 117, wherein retrieving the response from the second device by the first device from the second entry in the second buffer includes retrieving the response from the second device by the first device from the second entry in the second buffer of a memory of the first device.

Statement 120. An embodiment of the disclosure includes the article according to statement 117, wherein retrieving the response from the second device by the first device from the second entry in the second buffer includes retrieving the response from the second device by the first device from the second entry in the second buffer of a memory of the second device.

Statement 121. An embodiment of the disclosure includes the article according to statement 117, wherein retrieving the response from the second device by the first device from the second entry in the second buffer includes retrieving the response from the second device by the first device from the second entry in the second buffer of a memory of a third device.

Statement 122. An embodiment of the disclosure includes the article according to statement 116, wherein retrieving the response from the second device by the first device includes retrieving the response from the second device by the first device from a second entry in the buffer.

Statement 123. An embodiment of the disclosure includes the article according to statement 99, wherein establishing the entry by the first device includes establishing a packet structure by the first device.

Statement 124. An embodiment of the disclosure includes the article according to statement 123, wherein the packet structure includes a submission packet structure or a completion packet structure.

Statement 125. An embodiment of the disclosure includes the article according to statement 99, the non-transitory storage medium having stored thereon further instructions that, when executed by the machine, result in establishing the buffer.

Statement 126. An embodiment of the disclosure includes the article according to statement 125, wherein establishing the buffer includes establishing the buffer in a memory coupled to a processor.

Statement 127. An embodiment of the disclosure includes the article according to statement 125, wherein establishing the buffer includes establishing the buffer in a memory of the first device.

Statement 128. An embodiment of the disclosure includes the article according to statement 125, wherein establishing the buffer includes establishing the buffer in a memory of the second device.

Statement 129. An embodiment of the disclosure includes the article according to statement 125, wherein establishing the buffer includes establishing the buffer in a memory of a third device.

Statement 130. An embodiment of the disclosure includes the article according to statement 125, wherein establishing the buffer includes establishing the buffer by a processor in communication with the first device and the second device.

Statement 131. An embodiment of the disclosure includes the article according to statement 130, wherein establishing the buffer by the processor in communication with the first device and the second device includes:

identifying the first device by the processor;

identifying the second device by the processor; and establishing the buffer by the processor in communication with the first device and the second device includes establishing the buffer by the processor in communication with the first device and the second device based on the processor identifying the first device and the second device.

Statement 132. An embodiment of the disclosure includes the article according to statement 130, wherein establishing the buffer by the processor in communication with the first device and the second device includes:

notifying the first device about the buffer by the processor; and notifying the second device about the buffer by the
processor.

Statement 133. An embodiment of the disclosure includes
the article according to statement 125, wherein establishing
the buffer includes establishing the buffer by the first device.

Statement 134. An embodiment of the disclosure includes
the article according to statement 133, wherein establishing
the buffer by the first device includes:

identifying the second device by the first device; and establishing the buffer by the first device includes estab-
lishing the buffer by the first device based on the first
device identifying the second device.

Statement 135. An embodiment of the disclosure includes
the article according to statement 134, wherein identifying
the second device by the first device includes receiving a
notification from a processor in communication with the first
device and the second device by the first device about the
second device.

Statement 136. An embodiment of the disclosure includes
the article according to statement 134, wherein identifying
the second device by the first device includes receiving a
notification from the second device by the first device about
the second device.

Statement 137. An embodiment of the disclosure includes
the article according to statement 133, wherein establishing
the buffer by the first device includes notifying the second
device about the buffer by the first device.

Statement 138. An embodiment of the disclosure includes
the article according to statement 125, wherein establishing
the buffer includes establishing the buffer by the second
device.

Statement 139. An embodiment of the disclosure includes
the article according to statement 138, wherein establishing
the buffer by the second device includes:

identifying the first device by the second device; and establishing the buffer by the second device includes
establishing the buffer by the second device based on
the second device identifying the first device.

Statement 140. An embodiment of the disclosure includes
the article according to statement 139, wherein identifying
the first device by the second device includes receiving a
notification from a processor in communication with the first
device and the second device by the second device about the
first device.

Statement 141. An embodiment of the disclosure includes
the article according to statement 139, wherein identifying
the first device by the second device includes receiving a
notification from the first device by the second device about
the first device.

Statement 142. An embodiment of the disclosure includes
the article according to statement 138, wherein establishing
the buffer by the second device includes notifying the first
device about the buffer by the second device.

Statement 143. An embodiment of the disclosure includes
the article according to statement 125, wherein establishing
the buffer includes establishing the buffer by a third device.

Statement 144. An embodiment of the disclosure includes
the article according to statement 143, wherein establishing
the buffer by the third device includes:

identifying the first device by the third device;

identifying the second device by the third device; and establishing the buffer by the third device includes estab-
lishing the buffer by the third device based on the third
device identifying the first device and the second
device.

Statement 145. An embodiment of the disclosure includes
the article according to statement 144, wherein:

identifying the first device by the third device includes
receiving a first notification from a processor in com-
munication with the first device, the second device, and
the third device by the third device about the first
device; and identifying the second device by the third device includes
receiving a second notification from the processor in
communication with the first device, the second device,
and the third device by the third device about the
second device.

Statement 146. An embodiment of the disclosure includes
the article according to statement 144, wherein:

identifying the first device by the third device includes
receiving a first notification from the first device by the
third device about the first device; and identifying the second device by the third device includes
receiving a second notification from the second device
by the third device about the second device.

Statement 147. An embodiment of the disclosure includes
the article according to statement 143, wherein establishing
the buffer by the third device includes notifying the first
device and the second device about the buffer by the third
device.

Statement 148. An embodiment of the disclosure includes
the article according to statement 99, wherein the commu-
nication includes advertising a capability of the first device,
analytics of the first device, redirection of a write request
received at the first device from a processor, garbage col-
lection coordination, execution of a computational function
of the second device, or data migration from the first device.

Consequently, in view of the wide variety of permutations
to the embodiments described herein, this detailed descrip-
tion and accompanying material is intended to be illustrative
only, and should not be taken as limiting the scope of the
disclosure. What is claimed as the disclosure, therefore, is all
such modifications as may come within the scope and spirit
of the following claims and equivalents thereto.

What is claimed is:

1. A system, comprising:

a first device, the first device including a first memory;

a second device, the second device including a second
memory;

a processor to communicate with the first device and the
second device, the processor associated with a memory
of the system;

a first buffer in the first memory of the first device to store
a first entry including a first communication from the
second device to the first device, the first entry stored
in the first buffer in the first memory of the first device
by the second device;

a second buffer in the second memory of the second
device to store a second entry including a second
communication from the first device to the second
device, the second entry stored in the second buffer in
the second memory of the second device by the first
device;

a third buffer to store a third entry including a third
communication from the processor to the first device;
and a fourth buffer to store a fourth entry including a fourth
communication from the processor to the second
device.

2. The system according to claim 1, wherein the first
buffer includes a ring buffer.

3. The system according to claim 1, wherein the processor
is further configured to send a notification to the first device
and the second device about the first buffer in the first memory of the first device and the second buffer in the second memory of the second device.

4. The system according to claim 1, wherein the second communication includes advertising a capability of the first device, analytics of the first device, redirection of a write request received at the first device from the processor, garbage collection coordination, or execution of a computational function of the second device.

5. The system according to claim 1, wherein the processor is configured to establish the first buffer in the first memory of the first device and the second buffer in the second memory of the second device based at least in part on the processor identifying the first device and the second device.

6. The system according to claim 1, wherein:
the first device is configured to establish the first buffer in the first memory of the first device; and
the second device is configured to establish the second buffer in the second memory of the second device.

7. The system according to claim 1, further comprising:
a third device; and
a lock mechanism associated with the first buffer to control access to the first buffer,
wherein the second device is configured to store the first entry in the first buffer in the first memory of the first device based at least in part on the lock mechanism, and
wherein the third device is configured to store a fifth entry in the first buffer in the first memory of the first device based at least in part on the lock mechanism.

8. The system according to claim 1, wherein:
the first device includes a first storage device; and
the second device includes a second storage device.

9. The system according to claim 1, wherein:
the second entry includes a submission packet structure; and
the first entry includes a completion packet structure.

10. The system according to claim 1, wherein the first communication includes a response to the second communication.

11. A method, comprising:
establishing a first buffer in a first memory of a first device;
establishing a second buffer in a second memory of a second device;
identifying, at the first device in a system, the second device to which a second communication is to be directed;
establishing a second entry by the first device, the second entry including the second communication;
placing the second entry in the second buffer of the second memory of the second device by the first device for delivery to the second device,
identifying, at the second device in the system, the first device to which a first communication is to be directed;
establishing a first entry by the second device, the first entry including the first communication;
placing the first entry in the first buffer of the first memory of the first device by the second device for delivery to the first device,
wherein the first device retrieves the first entry from the first buffer in the first memory of the first device,
wherein the second device retrieves the second entry from the second buffer in the second memory of the second device, and
wherein the system further includes:
a processor;
a memory associated with a processor;

a third buffer to store a third entry including a third communication from a processor to the first device; and
a fourth buffer to store a fourth entry including a fourth communication from the processor to the second device.

12. The method according to claim 11, wherein the second communication includes advertising a capability of the first device, analytics of the first device, redirection of a write request received at the first device from the processor, garbage collection coordination, or execution of a computational function of the second device.

13. The method according to claim 11, wherein:
establishing the first buffer in the first memory of the first device includes establishing the first buffer in the first memory of the first device by the processor; and
establishing the second buffer in the second memory of the second device includes establishing the second buffer in the second memory of the second device by the processor.

14. The method according to claim 11, wherein:
establishing the first buffer in the first memory of the first device includes establishing the first buffer in the first memory of the first device by the first device; and
establishing the second buffer in the second memory of the second device includes establishing the second buffer in the second memory of the second device by the second device.

15. The method according to claim 11, wherein:
placing the first entry in the first buffer of the first memory of the first device by the second device for delivery to the first device includes securing for the second device a lock mechanism associated with the first buffer in the first memory of the first device; and
the system further includes a third device configured to place a fifth entry in the first buffer in the first memory of the first device based at least in part on the lock mechanism.

16. The method according to claim 11, wherein:
the first device includes a first storage device; and
the second device includes a second storage device.

17. The method according to claim 11, wherein:
the second entry includes a submission packet structure; and
the first entry includes a completion packet structure.

18. The method according to claim 11, wherein the first communication includes a response to the second communication.

19. An article, comprising a non-transitory storage medium, the non-transitory storage medium having stored thereon instructions that, when executed by a machine, result in:
establishing a first buffer in a first memory of a first device;
establishing a second buffer in a second memory of a second device;
identifying, at the first device in a system, the second device to which a second communication is to be directed;
establishing a second entry by the first device, the second entry including the second communication;
placing the second entry in the second buffer of the second memory of the second device by the first device for delivery to the second device,
identifying, at the second device in the system, the first device to which a first communication is to be directed;

establishing a first entry by the second device, the first
   entry including the first communication;
placing the first entry in the first buffer of the first memory
   of the first device by the second device for delivery to
   the first device,
wherein the first device retrieves the first entry from the
   first buffer in the first memory of the first device,
wherein the second device retrieves the second entry from
   the second buffer in the second memory of the second
   device, and
wherein the system further includes:
   a processor;
   a memory associated with a processor;
   a third buffer to store a third entry including a third
     communication from a processor to the first device;
     and
   a fourth buffer to store a fourth entry including a fourth
     communication from the processor to the second
     device.

20. The article according to claim 19, wherein the second communication includes advertising a capability of the first device, analytics of the first device, redirection of a write request received at the first device from the processor, garbage collection coordination, or execution of a computational function of the second device.

\* \* \* \* \*